US011218578B2

(12) United States Patent
Hooker et al.

(10) Patent No.: US 11,218,578 B2
(45) Date of Patent: Jan. 4, 2022

(54) METHODS AND APPARATUS FOR RECOVERING NETWORK ASSOCIATION INFORMATION

(71) Applicant: Casa Systems, Inc., Andover, MA (US)

(72) Inventors: Shane Hooker, Milford, NH (US); Bin Mo, Acton, MA (US); Jacob Eipe, Nashua, NH (US); Gaurav Paliwal, Waltham, MA (US)

(73) Assignee: Casa Systems, Inc., Andover, MA (US)

( * ) Notice: Subject to any disclaimer, the term of this patent is extended or adjusted under 35 U.S.C. 154(b) by 18 days.

(21) Appl. No.: 16/782,978

(22) Filed: Feb. 5, 2020

(65) Prior Publication Data
US 2020/0252489 A1 Aug. 6, 2020

Related U.S. Application Data

(60) Provisional application No. 62/801,365, filed on Feb. 5, 2019.

(51) Int. Cl.
*H04L 29/08* (2006.01)
*H04L 29/06* (2006.01)
(Continued)

(52) U.S. Cl.
CPC .......... *H04L 69/326* (2013.01); *H04L 5/0055* (2013.01); *H04L 47/34* (2013.01); *H04L 67/14* (2013.01); *H04L 69/163* (2013.01)

(58) Field of Classification Search
CPC ..... H04L 69/326; H04L 47/34; H04L 69/163; H04L 5/0055; H04L 67/14; H04L 29/08; H04L 5/00; H04L 29/06; H04L 12/801
(Continued)

(56) References Cited

U.S. PATENT DOCUMENTS 6,826,198 B2 * 11/2004 Turina ................... H04L 29/06
370/467
7,006,433 B1 * 2/2006 Dantu ................... H04M 7/066
370/218
(Continued)

OTHER PUBLICATIONS

International Search Report and Written Opinion dated Apr. 30, 2020 in connection with International Application No. PCT/US2020/016548.

*Primary Examiner* — Man U Phan
(74) *Attorney, Agent, or Firm* — Wolf, Greenfield & Sacks, P.C.

(57) ABSTRACT

The techniques described herein relate to methods, apparatus, and computer readable media configured to determine a current data transmission sequence number for a next packet in a communication session with a remote computing device. An interruption in the communication session is detected. Checkpointed data for the communication session is determined that is indicative of a previous sequence number used for a previous packet sent to the remote computing device. A resolution procedure is performed to determine the current data transmission sequence number for the next packet in the communication session, including determining an estimated next sequence number for transmitting data in the communication session based on the checkpointed data, transmitting a first packet to the remote computing device, receiving a second packet from the remote computing device that has an associated sequence number, and determining the current sequence number for the next packet in the communication session.

20 Claims, 11 Drawing Sheets

(51) Int. Cl.
*H04L 5/00* (2006.01)
*H04L 12/801* (2013.01)

(58) Field of Classification Search
USPC ............................................. 370/394
See application file for complete search history.

(56) References Cited

U.S. PATENT DOCUMENTS

| | | | | |
|---|---|---|---|---|
| 7,164,693 B2* | 1/2007 | Turina | .................... | H04L 29/06 370/467 |
| 7,685,290 B2* | 3/2010 | Satapati | .................. | H04L 29/06 709/227 |
| 7,733,914 B2* | 6/2010 | Baker | .................... | H04L 47/10 370/474 |
| 7,885,264 B2* | 2/2011 | Tateno | .................. | H04L 1/1832 370/394 |
| 7,903,546 B2* | 3/2011 | Dalal | .................... | H04L 67/14 370/221 |
| 7,929,422 B2* | 4/2011 | Ramalho | ................. | H04L 69/40 370/219 |
| 7,974,186 B2* | 7/2011 | Yonezawa | ........... | G06F 11/2097 370/225 |
| 7,996,517 B2* | 8/2011 | Carter | .................... | H04L 69/16 709/224 |
| 9,332,092 B2* | 5/2016 | Chen | ........................ | H04L 47/34 |
| 9,451,018 B2* | 9/2016 | Tremblay | ............... | H04L 67/148 |
| 9,495,378 B2* | 11/2016 | Sundaram | ............... | H04L 69/22 |
| 9,503,355 B2* | 11/2016 | Honda | ............... | H04N 21/4425 |
| 10,505,677 B2* | 12/2019 | Shpiner | .................... | H04L 1/08 |
| 10,757,147 B2* | 8/2020 | Campbell | ........... | H04L 65/1083 |
| 2001/0037326 A1 | 11/2001 | Bamford et al. | | |
| 2004/0197079 A1* | 10/2004 | Latvala | .................. | H04L 29/06 386/200 |
| 2006/0153202 A1* | 7/2006 | Dantu | .................... | H04L 69/40 370/395.52 |
| 2006/0159011 A1 | 7/2006 | Dalal et al. | | |
| 2006/0253575 A1 | 11/2006 | Carter et al. | | |
| 2010/0091710 A1* | 4/2010 | Jung | ................. | H04W 36/0011 370/328 |
| 2014/0293879 A1 | 10/2014 | Chen et al. | | |
| 2015/0063350 A1 | 3/2015 | Sundaram et al. | | |
| 2017/0237838 A1* | 8/2017 | Vandevoorde | .... | H04W 56/0015 370/350 |

* cited by examiner

| Column | 1 | 2 | 3 | 4 | 5 | 6 | 7 | 8 | 9 | 10 |
|---|---|---|---|---|---|---|---|---|---|---|
| Row | highest TSN sent | highest SSN sent [stream0, stream1] | highest TSN acked | base TSN sent | peer TSN resolved | local TSN resolved | local SSN resolved | Local SCTP endpoint | direction | Peer SCTP endpoint |
| 1 | 99 -> 100 | [0, 1] | | N/A | | | | dataPkt(100, 1, 1) | -> | |
| 2 | 100 | [0, 1] | | 100N/A | | | | | <- | SACK (100) |
| 3 | 100 | [0, 1] | | 100N/A | | | | | <- | data (200, 1, 10) |
| 4 | 100 | [0, 1] | | 100N/A | | | | SACK (200) | -> | |
| 5 | SWITCHOVER | | | | | | | | | |
| 6 | 90 | [0, 1] | | 90 | F | F | F | ENBCfgUpd (90, 1, U) | -> | |
| 7 | 90->100 | [0, 1] | 90->100 | 100 | F | F | F | | <- | SACK (100, dup 90) |
| 8 | 100->101 | [0, 1] | 100->101 | 100 | F | F | F | ENBCfgUpd (101, 1, U) | -> | |
| 9 | 101 | [0, 1] | | 100 | F | F | F | | <- | SACK (101) |
| 10 | 101 | [0, 1] | | 101 | T | F | F | | <- | enbCfgUpdAck (201, 1, 11) |
| 11 | 101->102 | [0, 1] | | 101 | T | F | F | SACK (201) ENBCfgUpd (102, 1, U) | -> | |
| 12 | 102 | [0, 1] | 101->102 | 101 | T | T | F | | <- | SACK (102) enbCfgUpdAck (202, 1, 12) |
| 13 | 102->103 | [0, 1->2] | | 102 | T | T | F | SACK (202) ENBCfgUpd (103, 1, 2) | -> | |
| 14 | 103 | [0, 2] | | 102 | T | T | F | | <- | SACK (103) enbCfgUpdAck (203, 1, 13) |
| 15 | 103->104 | [0->1, 2] | 102->103 | 102 | T | T | F | SACK (203) ENBCfgUpd (104, 0, 1) | -> | |
| 16 | 104 | [1, 2] | | 104 | T | T | T | | <- | SACK (104) enbCfgUpdAck (202, 1, 14) |
| 17 | 104->105 | [1, 2->3] | 103->104 | 104 | T | T | T | dataPkt(105,1,3) | -> | |

FIG. 5

| Column | 1 | 2 | 3 | 4 | 5 | 6 | 7 | 8 | 9 | 10 |
|---|---|---|---|---|---|---|---|---|---|---|
| Row | highest TSN sent | highest SSN sent [stream0, stream1] | highest TSN acked | base TSN sent | peer TSN resolved | local TSN resolved | local SSN resolved | Local SCTP endpoint | direction | Peer SCTP endpoint |
| 1 | 99 -> 100 | [0, 0 -> 1] | | 99 N/A | | | | dataPkt (100, 1, 1) | -> | |
| 2 | 100 | [0, 1] | 99 -> 100 | N/A | | | | | <- | SACK (100) |
| 3 | 100 -> 200 | [0, 1 -> 101] | | 100 N/A | | | | dataPkt (101, 1, 2) ... data(200, 1, 101) | -> | |
| 4 | | | | | | SWITCHOVER | | | | |
| 5 | 90 | [0, 1] | | 90 | F | F | F | ENBCfgUpd (90, 1, U) | -> | |
| 6 | 90 -> 110 | [0, 1] | 90 -> 110 | 100 | F | F | F | | <- | SACK (110) |
| 7 | 110 -> 150 | [0, 1] | 110 -> 150 | 100 | F | F | F | | <- | SACK (150) |
| 8 | 150 -> 200 | [0, 1 -> 101] | 150 -> 200 | 100 | F | F | F | | <- | SACK (200, dup 90) |
| 9 | 200 -> 201 | [0, 101] | 200 | 100 | F | F | F | ENBCfgUpd (201, 1, U) | -> | |
| 10 | 201 | [0, 101] | 200 -> 201 | 100 | F | F | F | | <- | SACK (201) |
| 11 | 201 | [0, 101] | | 201 | T | F | F | | <- | enbCfgUpdAck (201, 1, 11) |
| 12 | 201 -> 202 | [0, 101] | | 201 | T | T | F | SACK (201)<br>ENBCfgUpd (202, 1, U) | -> | |
| 13 | 202 | [0, 101] | 201 -> 202 | 100 | T | T | F | | <- | SACK (202)<br>enbCfgUpdAck (202, 1, 12) |
| 14 | 202 -> 203 | [0, 101 -> 102] | | 202 | T | T | F | SACK (202)<br>ENBCfgUpd (203, 1, 102) | -> | |
| 15 | 203 | [0, 102] | 202 -> 203 | 100 | T | T | F | | <- | SACK (203)<br>enbCfgUpdAck (203, 1, 13) |
| 16 | 203 -> 204 | [0 -> 1, 102] | | 203 | T | T | F | SACK (203)<br>ENBCfgUpd (204, 0, 1) | -> | |
| 17 | 204 | [1, 102] | 203 -> 204 | 100 | T | T | T | | <- | SACK (204)<br>enbCfgUpdAck (202, 1, 14) |
| 18 | 204 -> 205 | [1, 102 -> 103] | | 204 | T | T | T | dataPkt(205,1,103) | -> | |

FIG. 6

| Column | 1 | 2 | 3 | 4 | 5 | 6 | 7 | 8 | 9 | 10 |
|---|---|---|---|---|---|---|---|---|---|---|
| Row | highest TSN sent | highest SSN sent stream0 stream1 | highest TSN acked | base TSN sent | peer TSN resolved | local TSN resolved | local SSN resolved | local SCTP endpoint | direction | Peer SCTP endpoint |
| 1 | 99 -> 100 | [0, 0->1] | | 99 N/A | | | | dataPkt(100, 1, 1) | -> | |
| 2 | 100 | [0, 1] | 99->100 | N/A | | | | | <- | SACK (100) |
| 3 | 100->200 | [0, 1->101] | | 100 N/A | | | | dataPkt(101, 1, 2) ... data(200, 1, 101) | -> | |
| 4 | 200 | [0, 101] | 100->150 | N/A | | | | | <- | SACK (150) |
| 5 | 200 | [0, 101] | | 150 N/A | | | | dataPkt(151, 1, 52) ... dataPkt(200, 1, 101) | -> | |
| 6 | | | | | SWITCHOVER | | | | | |
| 7 | 90 | [0, 1] | | 90 | F | F | F | ENBCfgUpd (90, 1, U) | -> | |
| 8 | 90->200 | [0, 1->101] | 90->200 | 100 | F | F | F | | <- | SACK (200, dup list{90, 150, 151, ..., 200}) |
| 9 | 200->201 | [0, 101] | 200->201 | 100 | F | F | F | ENBCfgUpd (201, 1, U) | -> | |
| 10 | 201 | [0, 101] | | 100 | F | F | F | | <- | SACK (201) |
| 11 | 201 | [0, 101] | 201 | 100 | T | F | F | | <- | enbCfgUpdAck (201, 1, 11) |
| 12 | 201->202 | [0, 101] | 201 | 100 | T | F | F | SACK (201) ENBCfgUpd (202, 1, U) | -> | |
| 13 | 202 | [0, 101] | 201->202 | 100 | T | T | F | | <- | SACK (202) enbCfgUpdAck (202, 1, 12) |
| 14 | 202->203 | [0, 101->102] | | 202 | T | T | F | ENBCfgUpd (203, 1, 102) | -> | |
| 15 | 203 | [0, 102] | 202->203 | 100 | T | T | F | | <- | SACK (203) enbCfgUpdAck (203, 1, 13) |
| 16 | 203->204 | [0->1, 102] | | 203 | T | T | F | ENBCfgUpd (204, 0, 1) | -> | |
| 17 | 204 | [1, 102] | 203->204 | 100 | T | T | T | | <- | SACK (204) enbCfgUpdAck (202, 1, 14) |
| 18 | 204->205 | [1, 102->103] | | 204 | T | T | T | dataPkt(205,1,103) | -> | |

FIG. 7

| Column | 1 | 2 | 3 | 4 | 5 | 6 | 7 | 8 | 9 | 10 |
|---|---|---|---|---|---|---|---|---|---|---|
| Row | highest TSN sent | highest SSN sent [stream0, stream1] | highest TSN acked | base TSN sent | peer TSN resolved | local TSN resolved | local SSN resolved | local SCTP endpoint | direction | Peer SCTP endpoint |
| 1 | 99 -> 100 | [0, 0->1] | 99 | N/A | | | | dataPkt (100, 1, 1) | -> | |
| 2 | 100 | [0, 1] | 99->100 | N/A | | | | | <- | SACK (100) |
| 3 | 100->101 | [0, 1->2] | 100 | | | | | dataPkt (101, 1, 2) | -> | |
| 4 | 101->102 | [0, 2->3] | 100 | | | | | dataPkt (102, 1, 3) | -> | |
| 5 | | | | | SWITCHOVER | | | | | |
| 6 | 90->100 | [0, 1] | 90 | 100 | F | F | F | ENBCfgUpd(90, 1, U) | -> | |
| 7 | 90->100 | [0, 1] | 100 | 100 | F | F | F | | <- | SACK (100, dup 90, gap start 1, gap end 1) |
| 8 | 100->101 | [0, 1] | 100 | 100 | F | F | F | ENBCfgUpd (101, 1, 2)<br>ENBCfgUpd(90, 1, U) | -> | |
| 9 | 101->102 | [0, 1->3] | 100->102 | 100 | T | F | F | | <- | SACK (102, dup 90) |
| 10 | | 102[0, 3] | 102 | 100 | T | F | F | | <- | enbCfgUpdateAck (202, 12) |
| 11 | 102->103 | [0, 3] | 102 | 100 | T | F | F | SACK (202)<br>ENBCfgUpd(103, 1, U) | -> | |
| 12 | | 103[0, 3] | 102->103 | 100 | T | T | F | | <- | SACK (103)<br>ENBCfgUpdAck (203, 13) |
| 13 | 103->104 | [0, 3->4] | 103 | 100 | T | T | F | SACK (203)<br>ENBCfgUpd (104, 1, 4) | -> | |
| 14 | | 104[0, 4] | 103->104 | 100 | T | T | F | | <- | SACK (104)<br>enbCfgUpdAck (204, 1, 14) |
| 15 | 104->105 | [0->1, 4] | 104 | 100 | T | T | F | SACK (204)<br>ENBCfgUpd (105, 0, 1) | -> | |
| 16 | | 105[1, 4] | 104->105 | 100 | T | T | T | | <- | SACK (105)<br>enbCfgUpdAck (205, 1, 15) |
| 17 | 105->106 | [1, 4->5] | 105 | 100 | T | T | T | dataPkt(106, 1, 5) | -> | |

FIG. 8

| Column | 1 | 2 | 3 | 4 | 5 | 6 | 7 | 8 | 9 | 10 |
|---|---|---|---|---|---|---|---|---|---|---|
| Row | highest TSN sent | highest SSN sent [stream0, stream1] | highest TSN acked | base TSN sent | peer TSN resolved | local TSN resolved | local SSN resolved | Local SCTP endpoint | direction | Peer SCTP endpoint |
| 1 | 99 -> 100 | [0, 0->1] | 99 | N/A | | | | dataPkt (100, 1, 1) | -> | |
| 2 | 100 | [0, 1] | 99->100 | N/A | | | | | <- | SACK (100) |
| 3 | | | | | SWITCHOVER | | | | | |
| 4 | 90 | [0, 1] | | 100 | F | F | F | ENBCfgUpd (90, 1, U) | -> | |
| 5 | 90 | [0, 1] | | 100 | F | F | F | ENBCfgUpd (90, 1, U) | -> | |
| 6 | 90 | [0, 1] | | 100 | F | F | F | ENBCfgUpd (90, 1, U) | -> | |
| 7 | 90 | [0, 1] | | 100 | F | F | F | ENBCfgUpd (90, 1, U) | -> | |
| 8 | 90 | [0, 1] | | 100 | F | F | F | ABORT | -> | |

FIG. 9

METHODS AND APPARATUS FOR RECOVERING NETWORK ASSOCIATION INFORMATION

RELATED APPLICATIONS

This application claims priority under 35 U.S.C. § 119(e) to U.S. Provisional Application Ser. No. 62/801,365, filed on Feb. 5, 2019, entitled METHODS AND APPARATUS FOR RECOVERING NETWORK ASSOCIATION INFORMATION, which is herein incorporated by reference in its entirety.

TECHNICAL FIELD

The techniques described herein relate generally to recovering network association information for a communication session, and in particular to recovering sequence numbers for a network association in the event of an interruption of the communication session.

BACKGROUND OF INVENTION

Various network communication protocols can be used to transmit data from one network device to another network device across a medium, such as a wired and/or wireless connection or network that connects the devices. In order to keep track of transmitted data, network communication protocols often assign a number, such as a sequence number, to each transmitted packet that is unique and/or incremented for each packet. The sequence number can be used by the sending device, such as to keep track of which packets the sending device has sent, which packets the receiving device has acknowledged, and/or the like. The sequence number can be used by the receiving device to keep track of which packets it has received from the sending device, which packet the receiving device expects to be the next packet from the sending device, and/or the like.

Network communication protocols often need to keep track of, and maintain, various data throughout a communication session. For example, network communication protocols often exchange initial sequences of control packets between devices to set up aspects of the communication session. Additionally, or alternatively, during the communication session the devices maintain various information, such as the current sequence number(s) for the packets and/or other information necessary to maintain the communication session. However, communication sessions can be interrupted, such as due to issues with the medium between the devices and/or due to issues with the devices themselves (e.g., a crash, limited resources causing the device to fall behind in processing, etc.). Such interruptions can jeopardize the ability of the devices to maintain information necessary to continue the communication session. If the devices cannot recover such information, the communication session must often be restarted, which is undesirable.

SUMMARY OF INVENTION

In accordance with the disclosed subject matter, apparatus, systems, and methods are provided for recovering network association information after an interruption, to avoid needing to restart the communication session.

Some embodiments relate to a computerized method for determining a current data transmission sequence number for a next packet in a communication session with a remote computing device. The method includes determining an interruption in the communication session, determining checkpointed data for the communication session, wherein the checkpointed data is indicative of a previous sequence number used for a previous packet sent to the remote computing device, and performing a resolution procedure to determine the current data transmission sequence number for the next packet in the communication session. The resolution procedure includes determining an estimated next sequence number for transmitting data in the communication session based on the checkpointed data, transmitting a first packet to the remote computing device, wherein the first packet is a dummy packet comprising the estimated next sequence number, receiving a second packet from the remote computing device, wherein the second packet comprises an associated sequence number, and determining, based on the estimated next sequence number, the second packet, the associated sequence number of the second packet, or some combination thereof, the current sequence number for the next packet in the communication session.

Some embodiments relate to an apparatus configured to determine a current data transmission sequence number for a next packet in a communication session with a remote computing device. The apparatus includes a processor in communication with memory. The processor is configured to execute instructions stored in the memory that cause the processor to determine an interruption in the communication session, determine checkpointed data for the communication session, wherein the checkpointed data is indicative of a previous sequence number used for a previous packet sent to the remote computing device, and perform a resolution procedure to determine the current data transmission sequence number for the next packet in the communication session. The resolution procedure includes determining an estimated next sequence number for transmitting data in the communication session based on the checkpointed data, transmitting a first packet to the remote computing device, wherein the first packet is a dummy packet comprising the estimated next sequence number, receiving a second packet from the remote computing device, wherein the second packet comprises an associated sequence number, and determining, based on the estimated next sequence number, the second packet, the associated sequence number of the second packet, or some combination thereof, the current sequence number for the next packet in the communication session.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 5 is a graph showing an example packet flow for a connection between a local endpoint and a peer endpoint, according to some embodiments.

FIG. 6 is a graph showing another example packet flow for a connection between a local endpoint and a peer endpoint, according to some embodiments.

FIG. 7 is a graph showing another example packet flow for a connection between a local endpoint and a peer endpoint, according to some embodiments.

FIG. 8 is a graph showing another example packet flow for a connection between a local endpoint and a peer endpoint, according to some embodiments.

FIG. 9 is a graph showing another example packet flow for a connection between a local endpoint and a peer endpoint, according to some embodiments.

DETAILED DESCRIPTION OF INVENTION

The techniques described herein can be used to recover network association information in the event of a failure, including to recover sequence number information. The techniques can leverage dummy packets, which are benign to the overall communication session, to trigger a peer to respond with its own data chunk, acknowledgment, and/or other response. The techniques can use the responses to discover the network association information in a manner that can be transparent to the peer, and can avoid aborting and/or restarting the network association. These and other techniques are discussed further herein.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

Figure 1A:
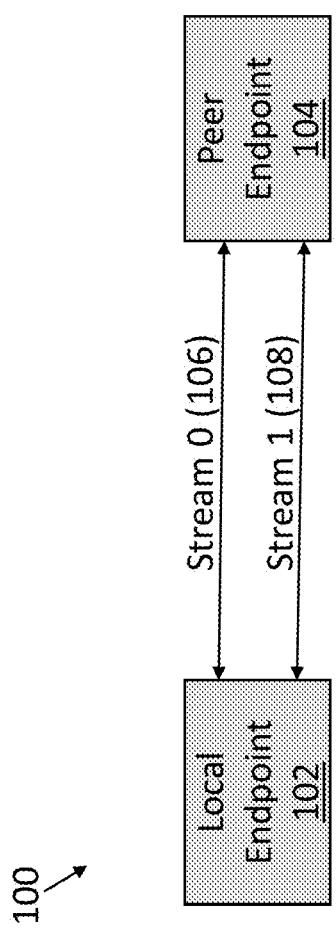
FIG. 1A shows an example of a connection between a local endpoint and a peer endpoint using the stream control transmission protocol, according to some examples.

The techniques described herein can be used to recover network association information for various types of communication protocols. One non-limiting example of such a protocol is the stream control transmission protocol (SCTP). SCTP can be used as a transport layer protocol, such as in place of, or in conjunction with, the Transmission Control Protocol (TCP) and/or the User Datagram Protocol (UDP). FIG. 1A shows an example of a connection 100 between a local endpoint 102 and a peer endpoint 104 using the SCTP protocol, according to some embodiments. SCTP allows multiple streams between endpoints, such that if one stream is blocked, the other stream can still be used to deliver data. The exemplary connection 100 illustrated in FIG. 1A includes two streams, stream 0 106 and stream 1 108.

The local endpoint 102 and peer endpoint 104 will exchange a series of control messages in order to establish SCTP associations and state. The Transmission Sequence Number (TSN) and Stream Sequence Number (SSN) are values that are applied to SCTP data chunks to ensure packets are delivered reliably and in order. The TSN can be used as the sequence number for the entire data stream (e.g., used in fragmentation for reassembly). The SSN can define chunks in a particular stream. Upon establishment of the SCTP association each endpoint can identify an initial value used for TSN and SSN and will send SCTP data chunks with the expected values, incrementing them for each SCTP data chunk. Each endpoint can use its own associated TSN and SSN values, such that the local endpoint 102 has a local TSN and SSN(s) for the packets it sends, and the peer endpoint 104 has its own peer TSN and SSN(s) for the packets it sends.

Figure 1B:
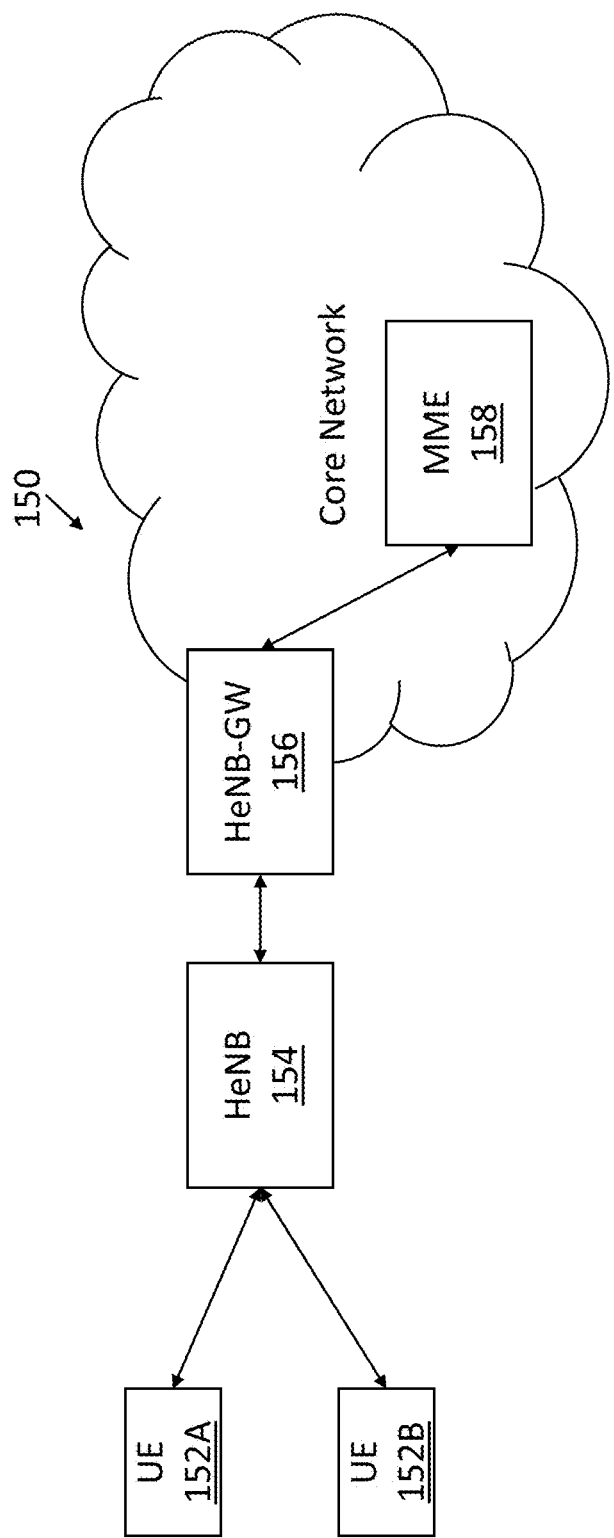
FIG. 1B shows an exemplary portion of an LTE Radio Access Network, according to some examples.

FIG. 1B shows an exemplary portion of an LTE Radio Access Network (RAN) 150, according to some examples. One or more UEs, shown in FIG. 1B as UE's 152A through 152B (collectively referred to as UE 152) communicate with a small cell, shown as Home eNodeB (HeNB) 154. The Home eNodeB Gateway (HeNB-GW) 156 aggregates traffic from the HeNB 154 to the core network. In this illustrative example, the HeNB-GW 156 uses SCTP as the transport protocol between HeNB 154 and the Mobile Management Entity (MME) 158, which is a control-node of the LTE access network. Other aspects of the LTE RAN 150 are omitted for simplicity, although one of skill will appreciate the various components that can be included in the LTE RAN 150.

When one SCTP endpoint experiences a failure, such as a High Availability (HA) switchover or process restart, the SCTP association must continue to use the next expected TSN and SSN values. Otherwise, improper TSN and/or SSN values can cause the peer to detect an error, which can lead to aborting the association (e.g., via an ABORT packet to the other endpoint) and/or not processing data packets. An SCTP restart procedure is specified in RFC-4960 for reinitializing the association's TSN and SSN values, which is hereby incorporated by reference herein in its entirety. The SCTP restart procedure relies on using the same exchange of control messages (e.g., including INIT, INIT-ACK, COOKIE-ECHO, and COOKE-ACK packets) that are used when the local endpoint 102 and peer endpoint 104 first established the association. This procedure is discussed in, e.g., Section 5.2.4.1 of RFC-4960. The SCTP restart procedure typically requires that the peer endpoint 104 participate and/or be aware that the local endpoint 102 is restarting. For example, the peer endpoint 104 must be able to find the existing Transport Control Block (TCB) for the association using the information passed in the INIT packet from the restarting endpoint. The TCB is a data structure that contains connection information on either side of an SCTP connection. During an SCTP restart, heartbeat messages between the endpoints will typically continue to be exchanged, but SCTP data chunks will typically be dropped since TSN/SSN values must be reset during the negotiation. In some implementations, the MME may not find an existing association, which may cause the MME to instead create a new association (e.g., which can leave UEs already using the association to lose their transport and experience data loss). In some implementations, since the peer needs to participate in the restart, once the peer determines that an SCTP restart is occurring, the peer may be configured to ensure that any state associated with the prior SCTP association is migrated, which could include any UE context. In addition, or in the alternative, there may be some undesirable actions taken by the peer when it detects an SCTP association has been restarted, such as alarms and/or other events.

The applicants have discovered and appreciated that to support HA, the SCTP association(s) in a network (e.g., between the HeNB-GW and the HeNB and/or MME) should survive an endpoint failure, such as a process restart or switchover, without causing teardown of the association. The applicants have developed unique techniques for recovering the SCTP associations and resolving the SCTP stream's TSN and SSN values between peers in a way that is transparent to the peer such that the peer need not be aware of the local endpoint restarting. As discussed herein, the techniques can use supported SCTP/S1AP elementary messages and/or procedures in a unique way to allow the SCTP association to survive the failure. The techniques can be compatible with 3rd party devices, and/or can require no special behavior by the SCTP association's peer.

In some embodiments, the techniques can be used with endpoints that do not support SCTP restart mechanisms (e.g., as specified by RFC-4960). Without supporting an SCTP restart mechanism, when a failure occurs, the applicants have discovered and appreciated that SCTP associations are likely affected (e.g., aborted), which can adversely impact the customer's established UE connections. The techniques provided herein can be used as an alternate way of performing one or more of maintaining the SCTP associations, restoring state, and/or resolving the SCTP stream's TSN and SSN values after failover. By performing such actions, data traffic can resume without requiring changes and/or special behavior by the endpoint (e.g., by a MME that does not support SCTP restart mechanisms).

The inventors have also discovered and appreciated that while TSN and SSN values can be checkpointed (e.g., stored and maintained during the association as the TSN and SSN values change), checkpointing each and every TSN and SSN change and recovering state is typically not practical, and can instead prove to be problematic under real network and traffic conditions. For example, such continuous checkpointing can consume significant resources, which can negatively impact the endpoint's performance. The techniques described herein provide for checkpointing an initial state of the SCTP association by the local SCTP endpoint. As noted above, the checkpointed values typically are not kept current, e.g., due to traffic rates, delays in data processing, and/or the like. The techniques described herein can transparently resolve the expected TSN and SSN values by learning them from the peer's SCTP acknowledgments (e.g., SACK messages) and data chunks after failure, leveraging the checkpointed data. The techniques can be used to resume sending data over the established SCTP association without needing to, for example, perform an SCTP restart and/or reinitialize any state on the SCTP peer.

In some embodiments, the checkpointed value of the highest acknowledged TSN can be used immediately after failover to send an initial dummy SCTP data packet (e.g., a packet that is benign to the SCTP association) to the peer endpoint with a TSN that is expected to be reported by the peer as a duplicate. For example, the techniques can send the dummy packet with a TSN value that is less than the highest TSN acknowledged to attempt to send a known duplicate. A known duplicate can, for example, allow the local node to distinguish a SACK from the peer that is acknowledging receipt of the dummy packet and a SACK being sent to acknowledge some (previously-sent) in-flight data. In-flight data can include data that was sent by the local node using TSN/SSN values that were not checkpointed (e.g., where the last checkpoint occurred prior to the local node sending that data). Upon receipt, if a duplicate, the peer will send an SCTP SACK indicating the highest TSN received and indicating the initial dummy data packet as a duplicate. Once the initial dummy packet is identified as a duplicate, the local endpoint can begin using the cumtsn reported in the SACK as the highest TSN to send subsequent dummy data packets.

In some embodiments, the dummy packets can be dummy packets that will prompt a response from the peer. For example, in some embodiments an S1AP ENB Configuration Update, which contains no elements, can be used because the packet is responded to by the peer with a matching S1AP ENB Configuration Update Ack or Failure. Therefore, dummy packets can be used that will cause the peer to respond to the dummy data chunk with a data response and/or a SACK.

In some embodiments, the dummy packet can include data designed to cause no change upon receipt by the peer. Therefore, for example, the packets are benign to the overall communication session, but can be used to resolve the TSN and/or SSN values. For example, an ENB Configuration Update can be used with no new or modified information, such that the packet results in no state change at the peer. In some embodiments, the dummy data packets can be sent as SCTP unordered packets, such that the SSN value included in the dummy packet is irrelevant and not checked by the peer. In some embodiments, the techniques can restrict all data to be sent over one SCTP stream. Restricting data traffic to a single stream can, for example, allow the peer to accurately calculate the SSNs used by in-flight data, and adjust the SSN for new data after resolving the TSN and SSN.

In some embodiments, the information sent in response to the initial dummy packet from the peer is used to determine whether to adjust the locally stored TSN and/or SSN values. For example, the information from a peer's SACK (e.g., cumulative TSN, gaps, and/or dups) can be used and compared to locally stored last sent values to determine if the local TSN and/or SSN need to be adjusted. If gaps or dups are reported, the techniques can calculate the adjustment of the TSN and SSN that is needed, and additional dummy SCTP data packets can be sent to the peer, as necessary. In the case of gaps, dummy data packets will use the TSN of the gaps reported by the peer in order to resolve TSN. When the peer reports duplicates, which can be expected since the initial dummy packet can be an intentional duplicate, the techniques can adjust the next TSN for the next dummy packet to be one more than the value that the peer reports as the last acknowledged TSN.

The dummy packet transmission procedure can continue until achieving a desired response from the endpoint that is indicative of resolving the TSN and/or SSN values. For example, the recovering local node can be configured to perform the transmission procedure until it receives a SACK from the peer that reports no gaps or duplicates, and acknowledges the last sent dummy packet (e.g., which resolves the peer's TSN value). As another example, the local node can be configured to perform the transmission procedure until it receives a response (e.g., an ENB Configuration Update ACK) that is indicative of resolving the cumulative TSN that the local recovering node will use when sending a SACK to the peer. The local recovering node can be configured to assume that all packets prior to an acknowledgement have been received. In some embodiments, the techniques can therefore allow some minimal data loss during recovery.

The techniques can be designed so that the local node can discover how many packets were in-flight and were processed by the peer, in order to properly calculate the SSN value to use for sending new data. In some embodiments, unlike the TSN values (e.g., the local and/or peer TSN), the SSN cannot be learned directly from the SACK. The techniques can use the checkpointed data set of last sent TSN, SSN pair to determine the SSN. For example, the peer can compare the last checkpointed data to the cumulative TSN reported by the peer to determine the number of SCTP data packets which were in-flight (e.g., sent but not checkpointed). The computed delta can be used to determine the proper SSN for the next real SCTP data packet. The techniques can use the receipt of a certain response from the peer, such as an S1AP ENB Configuration Update ACK from the peer, to determine when to exit the process of resolving the TSN and SSN.

Figure 1C:
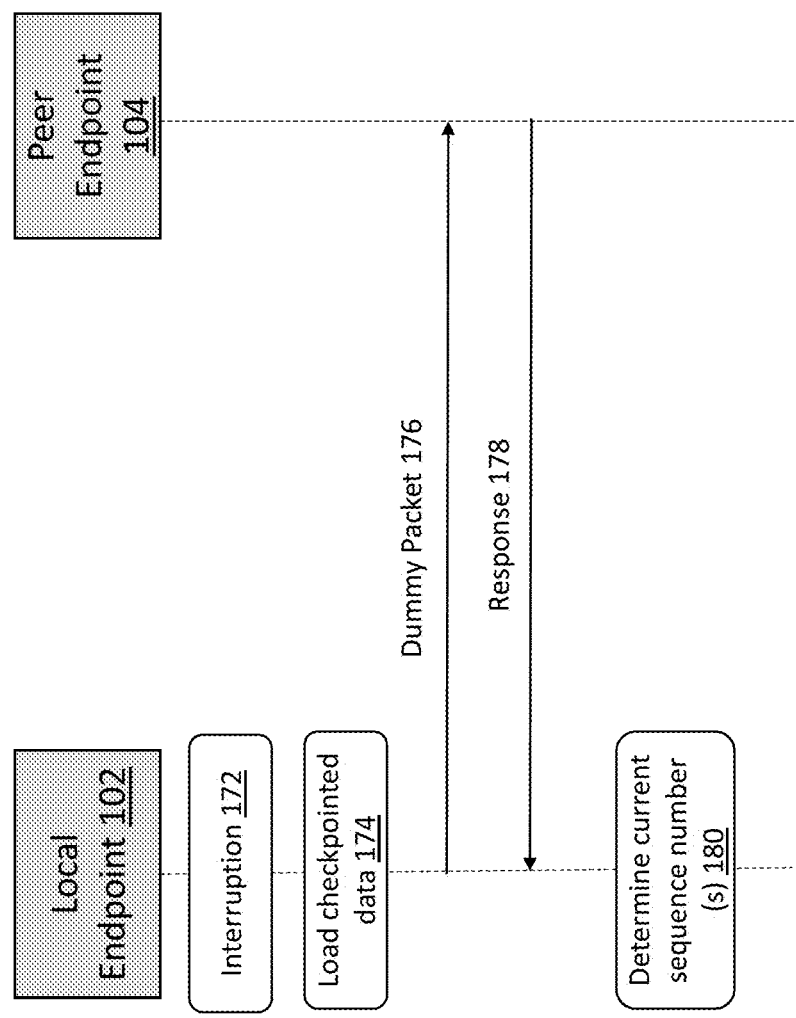
FIG. 1C illustrates a high-level procedure performed by a local endpoint to resolve network association information, according to some embodiments.

FIG. 1C illustrates a high-level procedure performed by the local endpoint 102 to resolve network association information, according to some embodiments. At step 172, the local endpoint determines an interruption in the communication session with the peer endpoint 104. At step 174, the local endpoint 102 determines checkpointed data for the communication session. As discussed herein, generally the checkpointed data includes at least information related to a previous sequence number used for a previous packet sent by the local endpoint 102 to the peer endpoint 104. The local endpoint then performs a resolution procedure to determine the current data transmission sequence number for the next packet in the communication session. At step 176, the local endpoint 102 determines an estimated next sequence number for transmitting data in the communication session based on the checkpointed data (e.g., an intentionally duplicate sequence number), and transmits a dummy packet to the peer endpoint 104 that includes the estimated next sequence number. At step 178, the peer endpoint 104 receives a response from the peer endpoint 104, which includes a responding sequence number. The local endpoint 102, at step 180, determines, based on internally stored information (e.g., the checkpointed data and/or the estimated next sequence number) and the response (e.g., including the associated sequence number of the response), the current sequence number for the next packet in the communication session. FIG. 1C is intended to be a simplistic exemplary example, since in practice the local endpoint 102 may need to send multiple dummy packets and analyze multiple responses in order to resolve the desired information, as discussed further herein. For example, if the response 178 indicates that there are gaps and/or duplicates, then the local endpoint 102 may send additional dummy packets to resolve the TSN and/or SSN of the association.

Figure 2:
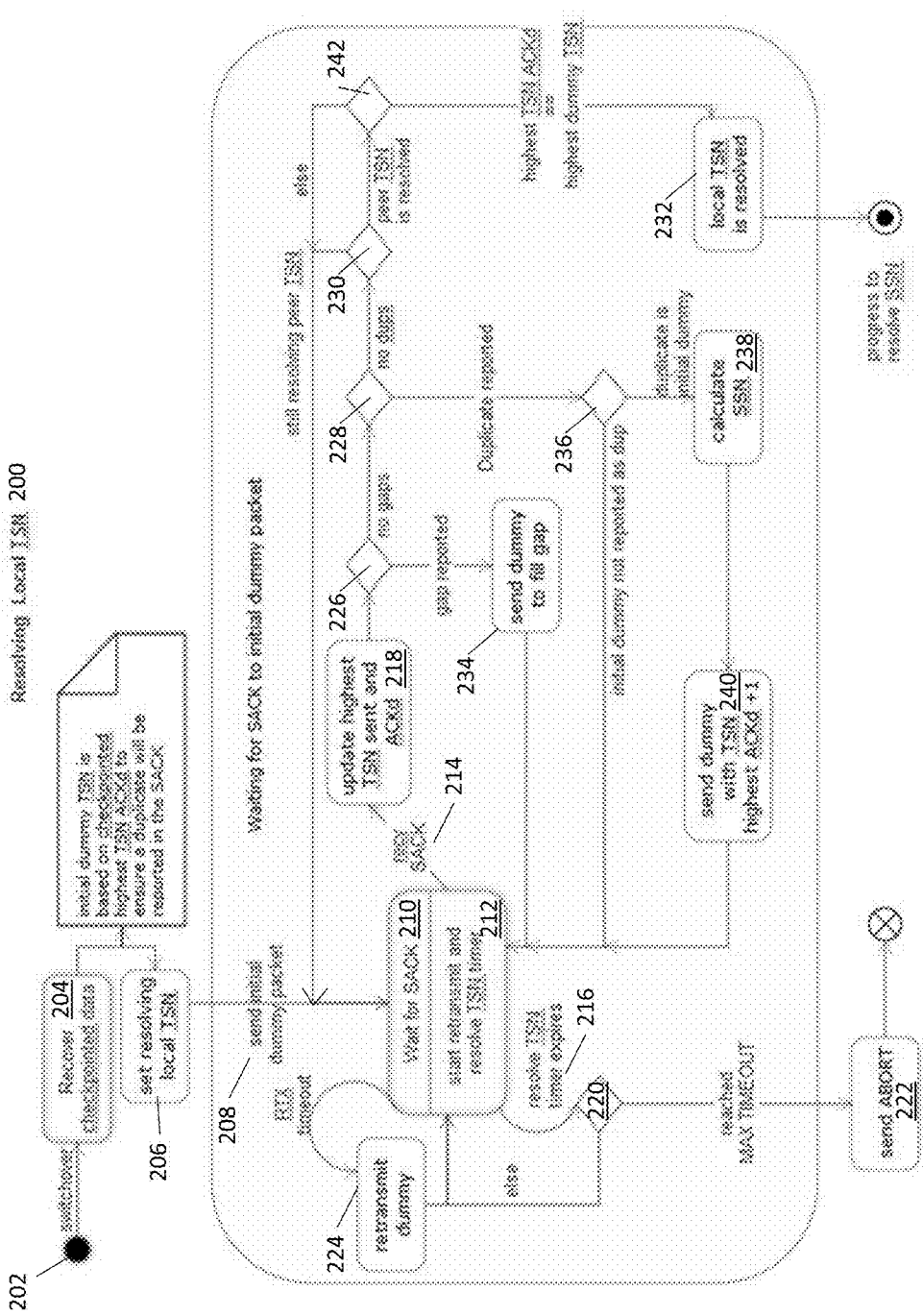
FIG. 2 is an exemplary flow diagram of a computerized method for resolving a local TSN, according to some embodiments.

FIGS. 2-5 show detailed examples of the network association resolution process. FIG. 2 is an exemplary flow diagram of a computerized method for resolving a local TSN, according to some embodiments. At step 202, the local endpoint determines there is a switchover or other interruption/error, which causes the local device to begin resolving the local TSN. Upon entering the resolve state, the local endpoint can block any data that the endpoint has to send to the peer (e.g., until after completion of the resolution procedure). At step 204, the local endpoint recovers the checkpointed data. The checkpointed data can include, for example, a highest TSN and/or SSN sent to a peer endpoint, a highest TSN acked by the peer endpoint, and/or other TSN or SSN data, as will be discussed further herein. The checkpointed data may or may not be current. For example, as discussed above, some endpoints may not checkpoint data for each packet sent or received, since doing so would consume too much resources (e.g., which can cause performance issues). Therefore, for example, under heavy congestion, the peer may have checkpointed TSN and/or SSN information for older data that was sent. While the checkpointed data may be out of date, it can still provide the local endpoint with sufficient information to learn the current local TSN information, as discussed further herein.

At step 206, the local endpoint can optionally set internal variable(s) and/or metadata to record that the local endpoint is resolving the local TSN.

At step 208, the local endpoint sends an initial dummy packet. The dummy packet can be, for example, a packet that is benign to the communication session, e.g., such that the dummy packet does not affect the communication between the local endpoint and the peer. The dummy packet can, for example, avoid causing the peer to send a negative acknowledgment (e.g., a NAC), such that the dummy packet can cause the peer to transmit back a positive acknowledgment and/or data to the local endpoint in response to the dummy packet. The dummy packet can be, for example, an SCTP data packet, such as an ENBCfgUpd packet and/or any other packet that does not cause a state change at the peer and results in the peer sending a message in response that similarly does not cause any state change in the local endpoint. The local endpoint can determine one or more fields for the dummy packet based on the checkpointed data. For example, the initial dummy packet can include a TSN and/or SSN value determined based on the checkpointed data. In some embodiments, the checkpointed data (e.g., TSN and/or SSN) is used for the dummy packet. In some embodiments, a lower value than the checkpointed data can be used for the initial dummy packet (e.g., to intentionally send a duplicate packet). For example, a predetermined value (e.g., two, five, ten, etc.) can be subtracted from the checkpointed data for use in the dummy packet. In some embodiments, the dummy packet is an unordered packet to the peer so that the peer ignores the SSN and it is not sent for processing.

At step 210, the local endpoint waits for a response from the peer endpoint to which it sent the dummy packet. At step 212, the local endpoint starts one or more timers. The timer can include, for example, a retransmit timer that sets a period of time for which the local endpoint will wait for a response from the peer endpoint for the particular dummy packet, and then, after expiration of that period, will retransmit the dummy packet. Each time a dummy packet is sent, the local endpoint can start the retransmit timer. As another example, the timer can include a resolve TSN timer that sets a period of time, or a number of retransmissions, or both, that once met cause the local endpoint to abort resolving the local TSN (e.g., to prevent the local endpoint from becoming deadlocked if the peer endpoint is no longer available). The resolve TSN timer can be started at the time of switchover. For example, the resolve TSN timer can specify a maximum time period to wait for a response from the peer, a maximum number of re-tries to send a dummy packet, and/or the like. For example, the time period can be a five second time period for the association as a whole. The retransmit timer and/or the resolve TSN timer can be maintained per SCTP association.

Once the local endpoint sets the timer(s) at step 212, the local endpoint will either receive a response at step 214, or the timer(s) will time out at step 216. If the timer(s) time out at step 216 (e.g., prior to receipt of a response from the peer), the local endpoint moves to step 220 and determines if a maximum timeout condition is met and/or expired. If the maximum timeout condition is met, the method proceeds to step 222 and aborts the process. If the maximum timeout condition is not met, the method proceeds to step 224 and retransmits the dummy packet sent at step 208, and proceeds back to step 210.

If the local endpoint receives a response from the peer endpoint at 214, the method proceeds to step 218. The response received at step 214 can be a SACK packet through which the peer endpoint acknowledges receipt of packets up to a specified TSN value. The TSN in the acknowledgment can be the TSN of the dummy packet, the TSN of previously sent packets (e.g., if the peer is behind), and/or a TSN greater than the TSN sent in the dummy packet (e.g., if the peer has received more data compared to what the local endpoint has checkpointed). The response can include other information, such as whether the peer endpoint detected a gap in TSN values, whether the peer endpoint detected a duplicate TSN value, and/or the like. Once the local endpoint moves to step 218, the local endpoint updates data recording the packets sent and/or acknowledged. In some embodiments, the local endpoint updates the highest acknowledged TSN to be the TSN in the response received at step 214. In some embodiments, the local endpoint updates the highest TSN sent to be the TSN value of the dummy packet sent at step 208. In some embodiments, rather than updating the highest TSN sent at step 218, the peer endpoint can update the highest TSN sent when it sends the dummy packet at step 208.

As discussed above, the packet from the peer may include various data. The techniques shown in FIG. 2 analyze the data in the packet to determine the local endpoint's appropriate response. At step 226, the peer endpoint determines whether there are any gaps based on the response received at step 214. If there is no gap, the peer endpoint proceeds to step 228. At step 228, the peer endpoint determines whether there are any duplicates based on the response received at step 214. If there are no duplicates, the peer endpoint proceeds to step 230, and determines whether the peer TSN is resolved. At step 230, if the peer TSN is not resolved, the peer endpoint proceeds back to step 210 and waits for a SACK. If at step 230 the peer TSN is resolved, the peer endpoint proceeds to step 242 to check to see if the highest TSN Ackd matches the highest dummy TSN sent. If those values do not match, the peer endpoint returns back to step 210 and waits for a SACK. If the values match, the peer endpoint moves to step 232 where the local TSN is declared resolved. As discussed herein, the local TSN can be resolved when the local endpoint has received a response to the last TSM sent to the peer, and the peer does not indicate there are any gaps or duplicates. For example, the peer endpoint can determine whether the highest TSN acknowledged by the peer is equal to the value that the local endpoint has stored as the highest TSN sent in the dummy packet(s). At step 232, for example, the peer endpoint can set data to indicate that the local TSN is resolved. For example, the local endpoint can change the variable or other data that it set at step 206 to record that it is complete resolving the peer TSN. Upon completion of resolving the peer TSN, the local endpoint can proceed to resolve the SSN, which is discussed further in conjunction with FIG. 4. Referring back to step 230, if the peer endpoint determines that it has not yet resolved the peer TSN, the peer endpoint proceeds back to steps 210/212 (e.g., to wait for a response from the peer endpoint to the initial dummy packet).

Referring back to step 226, if the local endpoint determines that there is a gap of one or more missing packets, the local endpoint proceeds to step 234 and sends one or more dummy packets to fill the gap. For example, for each missing TSN in the gap, the local endpoint creates a dummy packet with the missing TSN and sends the dummy packet(s) to the peer endpoint to fill the gap. In some embodiments, the local endpoint can send the original dummy packet with the known duplicate in addition to the packets being used to fill the gap. For example, the original dummy packet can be included because in processing a SACK message that contained gaps, it could indicate a duplicate of the initial dummy packet. In order to calculate the SSN, the peer endpoint may need to receive a SACK which indicates the initial dummy as a duplicate. For example, since at step 226 the local endpoint checks for gaps and then handles those gaps by generating another dummy packet for that indicated TSN, the peer endpoint can therefore in addition send the initial dummy packet again. Continuing with this example, once all the gaps have been filled, at step 226 the peer endpoint will determine no gaps and move to 228, where the peer endpoint we will find the dup reported and will find the initial dummy was the duplicate, and then calculate the SSN. The local endpoint proceeds from step 234 back to steps 210/212 to wait for a response from the peer endpoint to the dummy packet(s). Therefore, in some embodiments, when a gap is detected the peer endpoint sends a dummy packet using lowest TSN of the gap indicated, and waits for a SACK. With each gap dummy packet, the peer endpoint can also resend the initial dummy packet.

Referring back to step 228, if the local endpoint determines there are duplicates, the local endpoint proceeds to step 236. At step 236, the local endpoint determines whether the initial dummy packet was reported as a duplicate. If the initial dummy packet is a duplicate, the peer endpoint proceeds to step 238. In some embodiments, the peer endpoint may need to identify the initial dummy packet as the duplicate in order to distinguish dummy packets sent after the switchover event 202 from other in-flight data packets. At step 238, the local endpoint calculates the local SSN. As discussed herein, the SSN value may not be sent back from the peer endpoint. For example, the SSN value is not included in a SACK response from the peer endpoint. The local endpoint can calculate the SSN value during the local TSN resolution process discussed in conjunction with FIG. 2. In some embodiments, the local endpoint can purposely send more duplicate packets so that the local endpoint can continue to receive SACKs, which the local endpoint can use to identify dups and to use to increment SSN until it is current. In some embodiments, the local endpoint can be configured to calculate the SSN once the local endpoint receives the SACK with no gaps that identifies the initial dummy packet as a duplicate. The local endpoint can use the cumtsn reported by that SACK to determine the number of in-flight packets by comparing it to the checkpointed highest TSN ACKd, and then the local endpoint can adjust the SSN accordingly. The local endpoint proceeds from step 238 to step 240. At step 240, the local endpoint sends a dummy packet with the TSN set to the highest TSN acknowledged by the peer endpoint, plus one. The local endpoint then proceeds back to step 210. Referring back to step 236, if the initial dummy packet was not reported as a duplicate, the local endpoint proceeds back to step 210 (e.g., for a response to the initial dummy packet).

Figure 3:
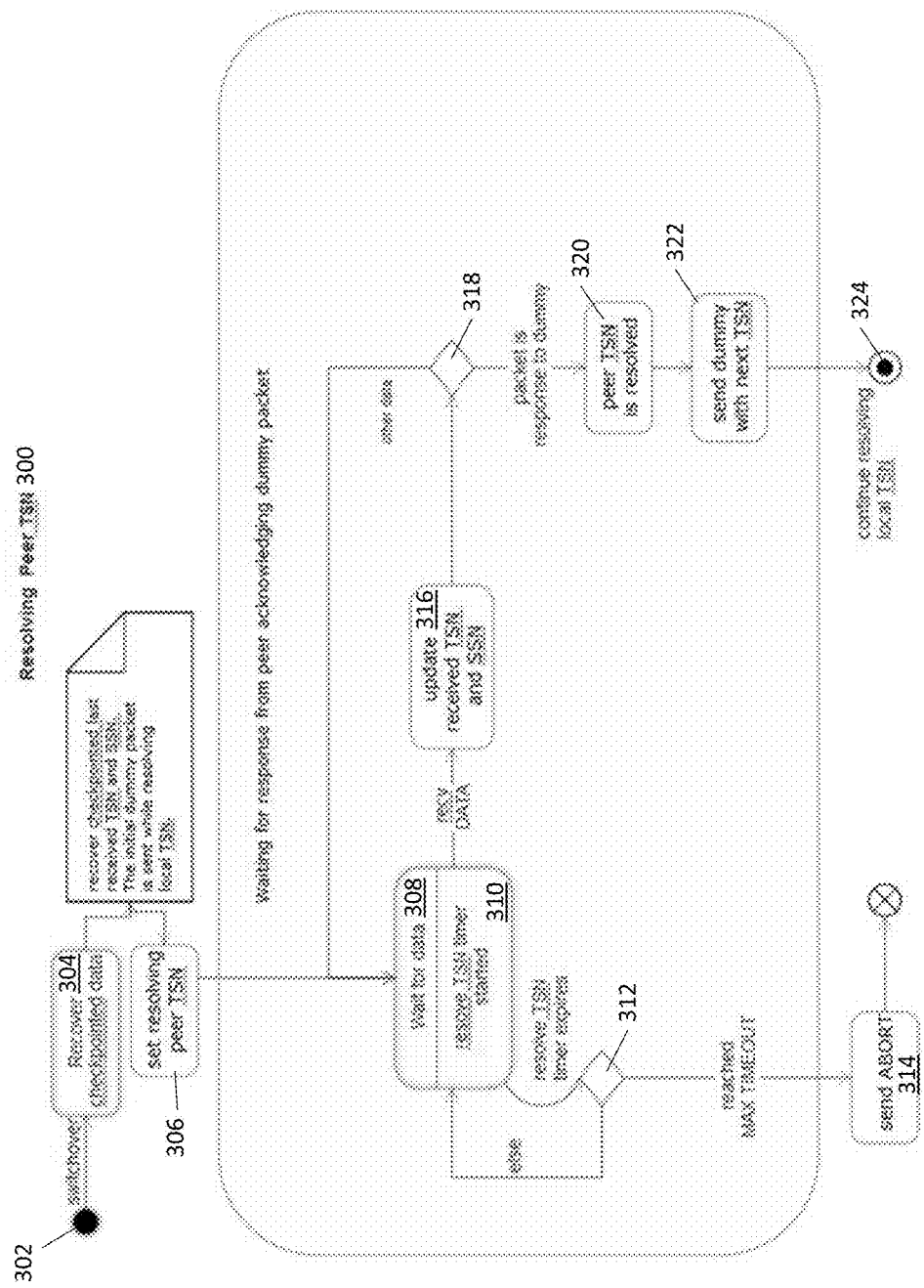
FIG. 3 is an exemplary flow diagram of a computerized method for resolving a peer TSN, according to some embodiments.

FIG. 3 is an exemplary flow diagram of a computerized method for resolving a peer TSN, according to some embodiments. At step 302, the local endpoint determines there is a switchover, which causes the local device to begin resolving the peer TSN. At step 304, the local endpoint recovers the checkpointed data, which may or may not be current. The checkpointed data can include a last received TSN and SSN from the peer endpoint in communication with the local endpoint. In some embodiments, the local endpoint can perform the peer TSN resolution process 300 after resolving other information, such as after resolving the local TSN (e.g., using the process described in FIG. 2). In such a case, an initial dummy packet may have already been sent during the prior resolution process. If a dummy packet has not yet been sent, the local endpoint can send a dummy packet (e.g., using a TSN and/or SSN determined based on the checkpointed data). At step 306, the local endpoint can optionally set an internal variable to indicate that the local endpoint is resolving the peer TSN.

The local endpoint proceeds to step 308 to wait for data from the peer. The local endpoint also starts a resolve TSN timer at step 310. If the resolve TSN timer expires, the peer endpoint proceeds to step 312 to determine whether the maximum timeout has been met. If the maximum timeout has not been met, the local endpoint proceeds back to steps 308/310. If the maximum timeout has been met, the local endpoint proceeds to step 314 and aborts the resolution process (e.g., to avoid a deadlock if the peer endpoint is not available, etc.).

Referring back to steps 308 and 310, if the local endpoint receives data from the peer endpoint, the local endpoint proceeds to step 316. At step 316, the local endpoint updates the received TSN and SSN based on the data from the peer endpoint. For example, the local endpoint can store the last received TSN and/or SSN from the peer. The local endpoint proceeds to step 318 and checks whether the received data was in response to the dummy packet. If the received data was not in response to the dummy packet, the peer endpoint proceeds back to step 308 to wait for data (e.g., to wait for data from the peer in response to the dummy packet). If the received data was in response to the dummy packet, the peer endpoint proceeds to step 320, and determines that the peer TSN is resolved. At step 322, the local endpoint sends another dummy packet with the next TSN. The local endpoint proceeds to step 324 and continues resolving the local TSN, as discussed in conjunction with FIG. 2. For example, the peer TSN resolution process 300 can be performed in conjunction with resolving the local TSN (e.g., as discussed in conjunction with FIG. 2).

Referring further to step 322, this next dummy is sent and used for resolving the local TSN. For example, referring to FIG. 2 at step 218, the local endpoint receives a SACK. Assuming the SACK reports the initial dummy data as a duplicate, the local endpoint proceeds to step 238 and calculates the SSN, and then proceeds to step 240 and sends a dummy with the TSN set to the highest ACKd+1. This causes the local endpoint to update the local variable of the highest TSN. Then the local endpoint again waits for a SACK. The local endpoint received a SACK and not a response (EnbCfgUpdAck) because the peer received the dummy EnbCfgUpd, but the SACK was a duplicate so it was not processed by the upper layer. So in FIG. 2, at step 240 the local endpoint will send the dummy which should generate both a SACK with no dups or gaps and a response (EnbCfgUpdAck) from the peer. When that happens, in FIG. 2 the local endpoint will process the SACK at step 230 (e.g., and determine the local endpoint is still waiting to resolve the peer, and therefore moves back to 210). Meanwhile, the EnbCfgUpdAck is processed in FIG. 3, and at step 318 the local endpoint can check and find the peer has responded, and will proceed to step 322 and send another dummy using the next TSN value (the local variable storing the highest TSN). Referring back to FIG. 2, that dummy packet sent by at step 322 in FIG. 3 triggers a SACK and EnbCfgUpdAck from the peer. Following FIG. 2, the SACK is processed as no dups or gaps, and at 230 the local endpoint determines the peer TSN is resolved and moves to step 232 and resolves the local TSN.

Figure 4:
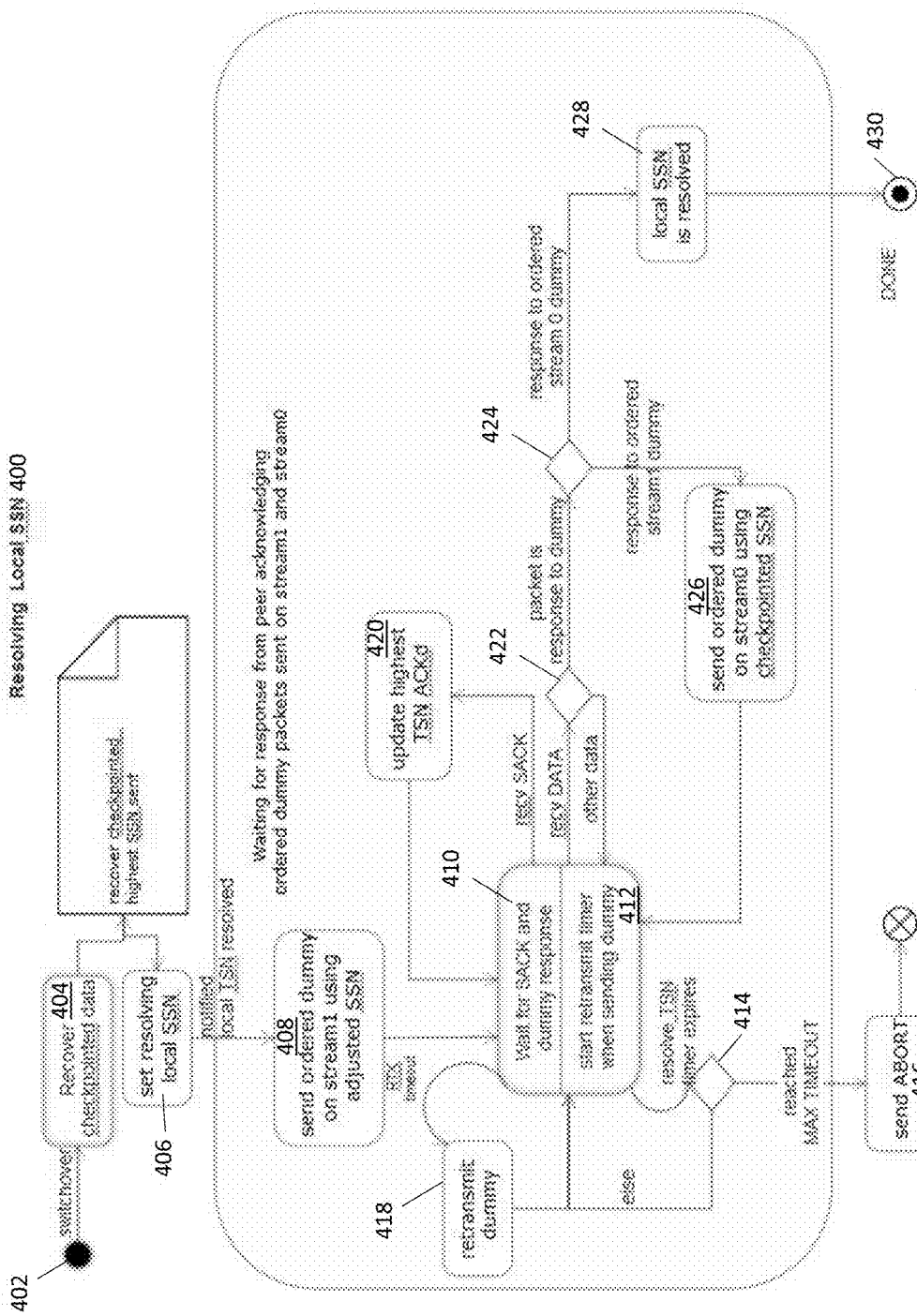
FIG. 4 is an exemplary flow diagram of a computerized method for resolving a local SSN, according to some embodiments.

FIG. 4 is an exemplary flow diagram of a computerized method for resolving a local SSN, according to some embodiments. At step 402, the local endpoint determines there is a switchover, which causes the local device to begin resolving the local SSN. At step 404, the local endpoint recovers the checkpointed data, which may or may not be current. As discussed herein, the checkpointed data can include SSN data, such as a highest SSN sent by the local endpoint to the peer endpoint. At step 406, the local endpoint can optionally set an internal variable to indicate that the local endpoint is resolving the local SSN. In some embodiments, the local endpoint can perform the local SSN resolution process after resolving other information, such as after resolving the local TSN (e.g., using the process described in FIG. 2). In such a case, the peer may wait until after completing the prior resolution process before moving from step 406 to step 408 (e.g., upon notification that the local TSN is resolved).

At step 408, the local endpoint sends an ordered dummy packet on stream 1 using an adjusted SSN. As discussed further herein, the local endpoint can use cumtsn to determine an initial adjustment to the local SSN. The local endpoint can continue to increment the local SSN for each packet sent on stream 1. The local endpoint proceeds to step 410 and waits for a packet from the peer endpoint. In some embodiments, the local endpoint waits for both an acknowledgment to the dummy packet and a response to the dummy packet from the peer endpoint. At step 412, the local endpoint sets a retransmit timer when it sends the ordered dummy packet. If the resolve TSN timer expires (e.g., the resolve TSN timer set in step 212 of FIG. 2 or 310 of FIG. 3), the local peer proceeds to step 414 and determines whether the maximum number of timeouts has been reached. If the maximum number of timeouts has been reached, the local endpoint proceeds to step 416 and aborts the resolution process. The local endpoint can, for example, send an ABORT message to the peer to abort the communication session. If the maximum number of timeouts has not been reached, the peer endpoint proceeds back to steps 410/412. Referring back to steps 410/412, if the retransmit timer expires, the local endpoint proceeds to step 418 and retransmits the dummy packet. The local endpoint then proceeds back to steps 410 and 412 to wait for a response to the retransmitted dummy packet.

From steps 410/412, if the local endpoint receives an acknowledgement of the dummy packet (e.g., a SACK), the peer endpoint proceeds to step 420 and updates the highest TSN acknowledged by the peer endpoint based on the acknowledgement (e.g., the peer endpoint sets the highest TSN acknowledged to the TSN value in the response). The local endpoint proceeds back to steps 410/412.

From steps 410/412, if the local endpoint receives data from the peer endpoint, the local endpoint proceeds to step 422 and determines if the data is in response to the dummy sent at step 408. If the data is not in response to the dummy packet, the local endpoint proceeds back to steps 410/412. If the data is in response to the dummy packet, the local endpoint proceeds to step 424 to determine if the data is in response to an ordered dummy on stream 0 or 1. If the data is in response to an ordered dummy on stream 1, the peer endpoint proceeds to step 426 and sends an ordered dummy on stream 0 using the checkpointed SSN. The peer endpoint then proceeds back to steps 410/412. If the data is in response to an ordered dummy on stream 0, the peer endpoint proceeds to step 428 and completes resolving the local SSN, and terminates the resolution process at step 430.

FIG. 5 is a graph showing an example packet flow for a connection between a local endpoint and a peer endpoint, according to some embodiments. As discussed above, various TSN and/or SSN information can be checkpointed, such as the highest TSN sent by the local endpoint, the highest SSN sent by the local endpoint (e.g., per channel), the highest TSN acknowledged by the peer, etc. Column 1 shows the highest TSN sent. Column 2 shows the highest SSN sent for both stream 0 and stream 1. Column 3 shows the highest TSN acknowledged. Column 4 shows the base TSN sent. Column 5 shows whether the peer TSN is resolved. Column 6 shows whether the local TSN is resolved. Column 7 shows whether the local SSN is resolved. Column 8 shows the actions of the local SCTP endpoint. Column 9 shows the direction of the packets being sent between the local SCTP endpoint and the peer SCTP endpoint. Column 10 shows the actions of the peer SCTP endpoint. Referring to columns 8 and 10, the exemplary packets/messages are shown in the format of TSN, stream ID, and SSN.

At row 1, the highest TSN sent from the local endpoint to the peer endpoint is 99, and the highest sent SSN is 0 for stream 0, and 1 for stream 1. As shown by column 8, the local endpoint sends a data packet to the peer endpoint on stream 1 with a TSN of 100 and an SSN of 1. At this point, the next expected TSN is 101 and the SSN is 2 for stream 1.

At row 2, the entry for column 1 is shaded to indicate that this is the time at which a checkpoint is performed. The checkpoint can include, for example, a last sent TSN of 100 and SSN of [0,1]. As shown by column 10, the peer sends a SACK that acknowledges the peer received all packets up to TSN 100.

At row 3, as shown by column 10, the peer sends data with a TSN of 200 and an SSN 10 to the local endpoint on stream 1. The TSN of 200 is used for packets sent from the peer to the local endpoint, and therefore need not have any relation to the TSN of 100 sent from the local endpoint to the peer.

At row 4, the local endpoint acknowledges the data by sending a SACK acknowledging up to TSN 200.

At row 5, a switchover (or other failure) occurs, which causes the local endpoint to begin to resolve the TSN and SSN with the peer endpoint using the techniques discussed herein.

At row 6, as shown at column 4, the local endpoint saves the checkpointed highest TSN sent as the base TSN sent (TSN of 100, in this example). At this point, as shown by columns 5-7, the local endpoint has not resolved the peer TSN or the local TSN or SSN (all are shown with "F" for false). The local endpoint computes the TSN for an initial dummy packet using the highest TSN acked to intentionally send a duplicate. In this example, the local endpoint computes the highest TSN minus 10 (100−10=90), and sends an unordered SCTP data packet ENBCfgUpd to the peer so that the peer ignores the SSN. As shown by column 3, the local endpoint sets the highest TSN acked to 90.

At row 7, the peer sends a SACK, which acknowledges TSN 100 (which was sent prior to switchover) and reports the initial dummy packet using TSN 90 as a duplicate. Upon receipt, as shown by column 3 the local endpoint updates the highest TSN acked based on the cumulative TSN (cumtsn) reported (100, in this example) from 90 to 100. Since a duplicate is reported for TSN 90, which was sent in the initial dummy TSN, the local endpoint calculates the SSN delta to be cumtsn (100)−base TSN sent (100, from column 4), which is 100−100=0. The local endpoint adds the SSN delta to the highest SSN sent for stream 1, which is 1+0=1, resulting in no change.

At row 8, the local endpoint send another dummy packet ENBCfgUpd using the next TSN of 101 to the peer. As shown by column 1, the local endpoint updates the highest TSN sent from 100 to 101.

At row 9, as shown by column 10, the peer sends a SACK to the local endpoint, which acknowledges the SSN of 101 and therefore reports no duplicates or gaps.

At row 10, as shown by column 10, the peer sends an enbCfgUpdateAck with a TSN of 201 and an SSN of 11 to the local endpoint. Upon receipt, the local endpoint assumes all packets prior have been received. As discussed above, this assumption can be made because the techniques can tolerate some data loss. This therefore resolves the peer TSN, as shown by column 5 reflecting a "T" for true.

At row 11, as shown by column 8, the local endpoint sends a SACK with a TSN of 201 to acknowledge receipt. Now that the peer TSN is resolved, the local endpoint also sends another dummy ENBCfgUpd packet using the next TSN of 102. As shown by column 1, the local endpoint updates the highest TSN sent from 101 to 102.

At row 12, as shown by column 10, the peer sends a SACK for TSN 102, which reports no gaps or dups. As shown by column 3, in response the local endpoint updates the highest TSN acked from 101 to 102. Since the peer TSN is resolved, and the highest TSN acked (102) is equal to the highest TSN sent (102, which is the highest dummy sent) this resolves the local TSN, as shown by column 6. The peer also sends an enbCfgUpdAck with TSN 202 and SSN 12.

At row 13, as shown by column 8, the local endpoint sends a SACK with TSN 202 to acknowledge receipt. The local endpoint also sends an ordered dummy packet ENBCfgUpd on stream 1, using the next TSN 103 and next SSN 2 which had previously just been calculated. As shown by column 1, the local endpoint updates the highest TSN sent from 102 to 103. The local endpoint also updates the highest SSN sent for stream 1 from 1 to 2.

At row 14, as shown by column 10, the peer processes the dummy with TSN 103 and SSN 2. The peer sends a SACK for the last dummy with TSN of 103. In response, the local endpoint updates the highest TSN acked from 102 to 103 as shown by column 3. The peer also sends a enbCfgUpdAck with TSN 203 and SSN 13.

At row 15, as shown by column 8, the local endpoint sends a SACK with TSN 203 to acknowledge receipt. The local endpoint also sends an ordered dummy ENBCfgUpd with TSN 104 on stream 0 using the next SSN for stream 0 (1). As shown in column 2, the local endpoint updates the highest SSN sent for stream 0 to 1.

At row 16, the peer sends a SACK with TSN 104 to acknowledge the last dummy, and sends an enbCfgUpdAck with TSN 202 and SSN 14, and the local endpoint presumes the SSN is correct for stream 0. For example, the local endpoint can presume that both the TSN and SSN sent by the peer are correct, and therefore tolerate any data that may have been lost. As shown by column 7, this completes resolving TSN and SSN.

At row 17, the next real data sent by the local endpoint will have the correct TSN (105) and SSN 3 for channel 1.

FIG. 6 is a graph showing another example packet flow for a connection between a local endpoint and a peer endpoint, according to some embodiments. As discussed further below, in this example, data is in flight during the switchover. Like with FIG. 5, Column 1 shows the highest TSN sent. Column 2 shows the highest SSN sent for both stream 0 and stream 1. Column 3 shows the highest TSN acknowledged. Column 4 shows the base TSN sent. Column 5 shows whether the peer TSN is resolved. Column 6 shows whether the local TSN is resolved. Column 7 shows whether the local SSN is resolved. Column 8 shows the actions of the local SCTP endpoint. Column 9 shows the direction of the packets being sent between the local SCTP endpoint and the peer SCTP endpoint. Column 10 shows the actions of the peer SCTP endpoint.

At row 1, the local endpoint sends data to the peer with TSN 100 and SSN 1. The highest TSN acknowledged is 99, as shown in column 3. The local endpoint increments the highest TSN sent from 99 to 100 (column 1), and increments the highest SSN sent for stream 1 from 0 to 1 (column 2).

At row 2, the peer next expected TSN is 100, and the next expected SSN is 1. As shown at column 10, the peer sends a SACK with TSN 100 to acknowledge that all packets up to TSN 100 were received. As shown at column 3, the local endpoint updates the highest TSN acked from 99 to 100. The entry for column 1 is shaded to indicate that the checkpointed highest TSN sent is 100.

At row 3, the local endpoint sends a burst of 100 data packets with TSN ranging from 101 to 200, and SSN ranging from 2 to 101. The local endpoint updates the highest TSN sent from 100 to 100 (column 1) and the highest SSN sent for stream 1 from 1 to 101 (column 2).

At row 4, a switchover occurs and now the local endpoint begins to resolve the TSN and SSN with the peer endpoint using the techniques discussed herein.

At row 5, the local endpoint saves the checkpointed highest TSN sent (100) as the base TSN sent, as shown in column 4. In this example, this value is 100 because that was what was last checkpointed (e.g., even though a burst of 100 data packets was sent since that last checkpoint). The local endpoint begins the procedure by determining the TSN for the dummy packet. As discussed above as an example, to intentionally send a duplicate, the local endpoint computes the highest TSN acked, minus 10 (in this example, 100−10=90), and as shown in column 9 sends an unordered SCTP dummy data packet ENBCfgUpd with TSN 90, so the SSN is ignored and not sent. The local endpoint adjusts the highest TSN sent to 90 as shown in column 1, and the highest TSN acked to 90, as shown in column 3. The local endpoint also uses the checkpointed highest SSN sent for stream 1 which was 1 corresponding with TSN 100. Note, the last SSN actually sent was 101 so the peer endpoint will be expecting an SSN of 102 for the next ordered data packet.

At row 6, the peer sends a SACK packet that acknowledges TSN 110 (sent prior to switchover). The SACK does not indicate that there are any dups or gaps. In particular, while a 100 data packet burst was sent, the data was inflight and is still being processed by peer. The local endpoint updates the highest TSN acked and highest TSN sent from 90 to 110 (shown in columns 1 and 3) and continues to wait for a duplicate with TSN 90 to be reported in response to the initial dummy packet.

At row 7, the peer endpoint continues to process the in-flight data and sends SACK back with TSN 150. The local endpoint continues to update the highest TSN sent and acked (from 110 to 150, as shown in columns 1 and 3) and waits.

At row 8, as shown in column 10 the peer endpoint sends a SACK which acknowledges TSN 200 (sent prior to switchover) and reports the initial dummy packet using TSN 90 as a duplicate. The local endpoint updates the highest TSN sent and ACKd based on the cumtsn reported (200). Since the duplicate TSN of 90 is reported, and it is the initial dummy TSN, the local endpoint calculates the SSN delta to be cumtsn−base TSN sent (200−100=100). The local endpoint adds the computed SSN delta to the highest SSN sent for stream 1 (1+100=101), as shown in column 2. At this point, the values for highest TSN sent and highest SSN sent now match the values the local endpoint had sent prior to switchover, shown in row 3.

At row 9, as shown in column 8 the local endpoint sends another dummy packet using the next TSN 201. As shown in column 1, the local endpoint updates the highest TSN sent from 200 to 201.

At row 10, as shown in column 10 the local endpoint receives a SACK with SSN 201 that reports no dups or gaps. The local endpoint updates the highest TSN acked from 200 to 201, as shown in column 3.

At row 11, the peer endpoint sends an enbCfgUpdateAck with TSN 201 and SSN 11, and the local endpoint assumes all packets prior have been received. This resolves the peer TSN, as shown in column 5.

At row 12, the local endpoint sends a SACK with TSN 201 to acknowledge receipt. Now that the peer TSN is resolved, the local endpoint sends another dummy ENDBCfgUpd using the next TSN of 202. As shown in column 1, the local endpoint updates the highest TSN sent from 201 to 202.

At row 13, the local endpoint receives a SACK for TSN 202 which reports no gaps or dups. Since the peer TSN is resolved and the highest TSN acked=highest TSN sent (highest dummy sent) this resolves the local TSN, as shown in column 6. The local endpoint updates the highest TSN acked from 201 to 202.

At row 14, as shown in column 8 the local endpoint sends a SACK with TSN 202 to acknowledge receipt. The local endpoint also sends an ordered dummy ENBCfgUpd on stream 1 using the next calculated SSN of 102. The local endpoint updates the highest TSN sent from 202 to 203 (column 1) and updates the highest SSN set for stream 1 to 102 (column 2).

At row 15, the peer endpoint sends a SACK with TSN 203 for the last dummy packet. The peer endpoint also sends an enbCfgUpdAck with TSN 203 and SSN 13, and the local endpoint presumes that the SSN is correct for stream 1 (e.g., tolerating some data loss). The local endpoint updates the highest TSN acked from 202 to 203.

At row 16, as shown in column 8 the local endpoint sends a SACK with TSN 203 to acknowledge receipt. The local endpoint also sends an ordered dummy packet ENBCfgUpd with TSN 204 on stream 0, using the next SSN for stream 0 of 1. The local endpoint updates the highest SSN sent from 0 to 1.

At row 17, as shown in column 10, the peer endpoint sends a SACK with TSN 204 for the last dummy, and an enbCfgUpdAck with a TSN of 202 and an SSN of 14, and the local endpoint presumes that the SSN is correct for stream 0. This completes resolving the TSN and SSN, as shown in column 7.

At row 18, the next real data sent by local endpoint will have the correct TSN and SSN, in this example a TSN of 205 and an SSN of 103.

FIG. 7 is a graph showing another example packet flow for a connection between a local endpoint and a peer endpoint, according to some embodiments. As discussed further below, in this example, data is in flight during the switchover with retransmissions occurring. Like with FIGS. 5-6, Column 1 shows the highest TSN sent. Column 2 shows the highest SSN sent for both stream 0 and stream 1. Column 3 shows the highest TSN acknowledged. Column 4 shows the base TSN sent. Column 5 shows whether the peer TSN is resolved. Column 6 shows whether the local TSN is resolved. Column 7 shows whether the local SSN is resolved. Column 8 shows the actions of the local SCTP endpoint. Column 9 shows the direction of the packets being sent between the local SCTP endpoint and the peer SCTP endpoint. Column 10 shows the actions of the peer SCTP endpoint.

At row 1, as shown in column 8 the local endpoint sends data to the peer with TSN 100 and SSN 1. The highest TSN acknowledged is 99, as shown in column 3. The local endpoint increments the highest TSN sent from 99 to 100 (column 1), and increments the highest SSN sent for stream 1 from 0 to 1 (column 2). The next expected TSN and SSN is (101, 2).

At row 2, as shown in column 10, the peer endpoint acknowledges that all packets up to TSN 100 were received with a SACK with TSN 100. The local endpoint updates the highest TSN acked from 99 to 100. The entry for column 1 is highlighted to indicate that the checkpointed TSN is 100 and checkpointed SSN for stream 1 is 1.

At row 3, as shown in column 8, the local endpoint sends a burst of 100 data packets with TSN ranging from 101 to 200 and SSN ranging from 2 to 101. The local endpoint updates the highest TSN sent from 100 to 200, and updates the highest SSN sent for stream 1 from 1 to 101.

At row 4, as shown in column 10, the peer acknowledges all packets up to TSN 150 were received, but the peer endpoint is slow processing the other packets or they were dropped. The local endpoint updates the highest TSN acked from 100 to 150.

At row 5, as shown in column 8, the local endpoint retransmit timer expires, and the local endpoint retransmits data packets that have not been acknowledged, namely the data packets with TSN 151 to 200. As noted above, these may have been received by the peer, just not yet processed in a timely manner and/or not received by the peer.

At row 6, a switchover occurs and now the local endpoint begins to resolve the TSN and SSN with the peer endpoint using the techniques discussed herein.

At row 7, the local endpoint saves the checkpointed highest TSN sent (100) as the base TSN sent (column 4). For example, this value is 100 because that was last checkpointed as noted above in row 2, and in this example checkpointing is lagging. As an example of a technique to intentionally send a duplicate, the peer determines the highest TSN acked–10 (100–10=90), and sends an unordered SCTP data packet ENBCfgUpd with TSN 90, so SSN is ignored and not sent. The local endpoint adjusts the highest TSN sent to 90 (column 1) and the highest TSN acked 90 (column 3). The local endpoint also recovers the highest SSN sent from checkpointed data which for stream 1 is 1.

At row 8, enough time has passed that allows the peer endpoint to catch up with processing. As shown in column 10, the peer sends SACK which acknowledges TSN 200 (sent prior to switchover) and reports all the retransmitted packets 151-200 as dups. It also reports the dummy packet with TSN of 90 as a dup. The peer updates the highest TSN acked from 90 to 200 (column 3) and the highest TSN sent from 90 to 200 (column 1). The peer device computes the SSN delta as cumtsn−base TSN, which is 200−100=100, and adjusts the SSN for stream 1 from 1 to 101.

At row 9, as shown in column 8, the local endpoint sends another dummy packet ENBCfgUpd using the next TSN 201. The local endpoint updates the highest TSN sent from 200 to 201.

At row 10, as shown in column 10 the peer endpoint sends a SACK with TSN 201, and which reports no dups or gaps. The peer updates the highest TSN acked from 200 to 201.

At row 11, as shown in column 10, the peer sends enbCfgUpdateAck with TSN 201 and SSN 11, and the local endpoint assumes all packets prior have been received. This resolves the peer TSN, as shown in column 5.

At row 12, the local endpoint sends a SACK with TSN 201 to acknowledge receipt. Now that the peer TSN is resolved, the local endpoint also sends another dummy ENBCfgUpd using the next TSN of 202. The local endpoint updates the highest TSN sent from 201 to 202 (column 1).

At row 13, the peer endpoint sends a SACK for TSN 202 which reports no gaps or dups. The local endpoint updates the highest TSN acked from 201 to 202. Since the peer TSN is resolved, and the highest TSN acked (202) is equal to the highest TSN sent (also 202, for the highest dummy sent) this resolves the local TSN, as shown in column 6.

At row 14, as shown in column 8 the local endpoint sends a SACK to acknowledge receipt of TSN 202. The endpoint also sends an ordered dummy ENBCfgUpd with TSN 203, SSN 102 on stream 1, using the next calculated SSN. The local endpoint updates the highest TSN sent from 202 to 203, and updates the highest SSN sent for stream 1 to 102.

At row 15, as shown in column 10, the peer endpoint sends a SACK for last dummy of TSN 203. The peer also sends a enbCfgUpdAck with a TSN of 203 and an SSN of 13, and the peer presumes the SSN is correct for stream 1. The local endpoint updates the highest TSN acked from 202 to 203.

At row 16, as shown in column 8, the local endpoint sends a SACK to acknowledge receipt of TSN 203. The local endpoint also sends an ordered dummy ENBCfgUpd on stream 0 using the next SSN of 1 for stream 0.

At row 17, as shown in column 10, the peer sends a SACK for the last dummy of TSN 204, and an enbCfgUpdAck with a TSN of 202 and an SSN of 14. The local endpoint updates the highest TSN acked from 203 to 204. This complete resolving TSN and SSN, as shown in column 7. At row 18, the next real data sent by the local endpoint will have the correct TSN and SSN, in this example of 205 and 103, respectively.

FIG. 8 is a graph showing another example packet flow for a connection between a local endpoint and a peer endpoint, according to some embodiments. As discussed further below, in this example, data is missing during the switchover so gaps are reported. Like with FIGS. 5-7, Column 1 shows the highest TSN sent. Column 2 shows the highest SSN sent for both stream 0 and stream 1. Column 3 shows the highest TSN acknowledged. Column 4 shows the base TSN sent. Column 5 shows whether the peer TSN is resolved. Column 6 shows whether the local TSN is resolved. Column 7 shows whether the local SSN is resolved. Column 8 shows the actions of the local SCTP endpoint. Column 9 shows the direction of the packets being sent between the local SCTP endpoint and the peer SCTP endpoint. Column 10 shows the actions of the peer SCTP endpoint.

At row 1, as shown in column 8 the local endpoint sends data to the peer with TSN 100 and SSN 1. The highest TSN acknowledged is 99, as shown in column 3. The local endpoint increments the highest TSN sent from 99 to 100 (column 1), and increments the highest SSN sent for stream 1 from 0 to 1 (column 2). The next expected TSN and SSN is (101, 2).

At row 2, as shown in column 10, the peer acknowledges all packets up to TSN 100 were received. The local endpoint increments the highest TSN acked from 99 to 100 (column 3). The entry in column 1 is highlighted to indicate that the TSN of 100 and SSN of 1 are checkpointed.

At row 3, the local endpoint sends data to the peer with TSN 101, SSN 2. The local endpoint increments the highest TSN sent from 100 to 101 (column 1) and the highest SSN sent for stream 1 from 1 to 2 (column 2). For this example, assume this packet somehow gets dropped and/or isn't received by the peer.

At row 4, the local endpoint sends data to the peer with TSN 102, SSN 3. The local endpoint updates the highest TSN sent from 101 to 102 (column 1) and updates the highest SSN sent for stream 1 from 2 to 3 (column 2).

At row 5, a switchover occurs and now the local endpoint begins to resolve the TSN and SSN with the peer endpoint using the techniques discussed herein.

At row 6, the local endpoint saves the checkpointed highest TSN sent (100) as the base TSN sent (column 4). The local endpoint calculates the highest TSN acked−10 (100−10=90), and sends unordered SCTP dummy packet ENBCfgUpd using SSN 90 so that the SSN is ignored and not sent. The local endpoint adjusts the highest TSN sent (column 1) and highest TSN acked (column 3) to be this value of 90. The local endpoint also recovers the highest SSN sent for stream 1 from checkpointed data and set to 1.

At row 7, the peer received TSN 102, but never received TSN 101 and also received the dummy duplicate with TSN 90. As shown in column 10, the peer sends a SACK which acknowledges TSN 102 and all data up to TSN 100 but indicates a gap of missing 1 packet, TSN 101, and also reports 90 as a duplicate. The local endpoint updates the highest TSN sent from 90 to 100 (column 1) and highest TSN ACKed (column 3) based on the cumtsn 100, and will send a dummy to fill in the gap. Since there is a dup of the initial dummy with TSN of 90, the local endpoint computes an SSN delta as cumtsn−base, which in this example is 100−100=0, so no SSN adjustment is done.

At row 8, as shown in column 8, the local endpoint determines from the SACK that TSN 101 was missing, and creates another dummy packet to send using TSN 101. The local endpoint also sends the initial dummy packet with known duplicate TSN 90. As discussed herein, the local endpoint can send the initial dummy packet so that the next SACK received will also report it as a duplicate (e.g., such that the local endpoint will be able to identify the SACK as reporting for the initial dummy packet). The peer updates the highest TSN sent from 100 to 101.

At row 9, as shown in column 10 the peer sends a SACK which acknowledges all packets up to TSN 102 and reports no gaps now. It again reports receiving the initial dummy packet 90 as a duplicate. The local endpoint updates the highest TSN sent from 101 to 102 (column 1). The local endpoint recognizes the duplicate as the initial dummy packet, and computes the SSN delta as the cumtsn−base TSN=102−100=2. The local endpoint adjusts the SSN for stream 1 by adding 2, thus changing it from 1 to 3 (column 2).

At row 10, the peer sends an enbCfgUpdateAck in response to the dummy TSN 101 that was sent to fill gap. This resolves the peer TSN, as shown in column 5.

At row 11, the local endpoint sends a SACK to acknowledge TSN 202. Upon resolving the peer TSN, the local endpoint also sends another dummy ENBCfgUpd using the next TSN 103. The local endpoint updates the highest TSN sent from 102 to 103 (column 1).

At row 12, as shown in column 10, the peer sends a SACK which acknowledges all packets up to TSN 103 and no dups or gaps are reported. This resolves local TSN, as shown in column 6. The peer also sends an ACK to the dummy packet with TSN 103.

At row 13, as shown at column 8, the local endpoint sends a SACK to acknowledge receipt of TSN 203. The local endpoint also sends an ordered dummy ENBCfgUpd on stream 1 using TSN 104 and the next calculated SSN of 4. The local endpoint updates the highest TSN sent from 103 to 104 (column 1) and the highest SSN sent for stream 1 from 3 to 4 (column 2).

At row 14, as shown in column 10, the peer endpoint sends a SACK for the last dummy TSN 104, and also sends an enbCfgUpdAck with TSN 204 and SSN 14. The peer presumes the SSN is correct for stream 1.

At row 15, the peer sends a SACK to acknowledge receipt of TSN 204, and also sends an ordered dummy ENBCfgUpd with TSN 105 on stream 0, using the next SSN for stream 0 of 1. The local endpoint updates the highest TSN sent from 104 to 105 (column 1) and the highest SSN sent for stream 0 from 0 to 1 (column 2).

At row 16, the peer sends a SACK for the last dummy TSN 105, and an enbCfgUpdAck of TSN 205 and SSN 15. The local endpoint presumes the SSN is correct for stream 0. This completes resolving TSN and SSN, as shown in column 7.

At row 17, the next real data sent by local endpoint will have the correct TSN and SSN, in this example of 106 and 5, respectively, for stream 1.

FIG. 9 is a graph showing another example packet flow for a connection between a local endpoint and a peer endpoint, according to some embodiments. As discussed further below, in this example, a timeout occurs while resolving the TSN. Like with FIGS. 5-8, Column 1 shows the highest TSN sent. Column 2 shows the highest SSN sent for both stream 0 and stream 1. Column 3 shows the highest TSN acknowledged. Column 4 shows the base TSN sent. Column 5 shows whether the peer TSN is resolved. Column 6 shows whether the local TSN is resolved. Column 7 shows whether the local SSN is resolved. Column 8 shows the actions of the local SCTP endpoint. Column 9 shows the direction of the packets being sent between the local SCTP endpoint and the peer SCTP endpoint. Column 10 shows the actions of the peer SCTP endpoint.

At row 1, as shown in column 8 the local endpoint sends data to the peer with TSN 100 and SSN 1. The highest TSN acknowledged is 99, as shown in column 3. The local endpoint increments the highest TSN sent from 99 to 100 (column 1), and increments the highest SSN sent for stream 1 from 0 to 1 (column 2). The next expected TSN and SSN is (101, 2).

At row 2, as shown in column 10, the peer acknowledges all packets up to TSN 100 were received. The local endpoint increments the highest TSN acked from 99 to 100 (column 3). The entry in column 1 is highlighted to indicate that the TSN of 100 is checkpointed.

At row 3, a switchover occurs, and now the local endpoint begins to resolve the TSN and SSN with the peer endpoint.

At row 4, the local endpoint saves the checkpointed highest TSN sent (100) as the base TSN sent. As shown at column 8, the local endpoint computes the highest TSN acked−10 (100−10=90), and sends an initial dummy packet, an unordered SCTP data ENBCfgUpd with TSN of 90, so the SSN is ignored and not sent. The local endpoint adjusts the highest TSN sent and highest TSN acked to be 90 (columns 1 and 3). The local endpoint starts a retransmit timer (e.g., retransmission timeout (RTO)) for a predetermined number of seconds waiting for SACK. The local endpoint also starts an idle timer for the association, which will expire every 5 seconds. The idle timer can be, for example, a resolve TSN timer that is used to determine whether to abort the procedure.

At row 5, after RTO the retransmit timer for the association expires. The local endpoint retransmits the initial dummy packet (an unordered ENBCfgUpd with TSN of 90).

At row 6, after RTO the retransmit timer for the association expires for the second time. The local endpoint again retransmits the initial dummy packet (an unordered ENBCfgUpd with TSN of 90).

At row 7, after RTO the retransmit timer for the association expires for the third time. The local endpoint retransmits the initial dummy packet (an unordered ENBCfgUpd with TSN of 90).

While each RTO expiration is not shown, after 10 times of a repeated RTO timer expiring, the local endpoint ABORTs the association.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A computerized method for determining a current data transmission sequence number for a next packet in a communication session with a remote computing device, the method comprising:
   determining an interruption in the communication session;
   determining checkpointed data for the communication session, wherein the checkpointed data is indicative of a previous sequence number used for a previous packet sent to the remote computing device; and
   performing a resolution procedure to determine the current sequence number for the next packet in the communication session, comprising:
      determining an estimated next sequence number for transmitting data in the communication session based on the checkpointed data;

transmitting a first packet to the remote computing device, wherein the first packet is a dummy packet comprising the estimated next sequence number, and wherein the first packet is configured so that the first packet is processed by the remote computing device regardless of an order of an estimated sequence number to an expected sequence number by the remote computing device;

receiving a second packet from the remote computing device, wherein the second packet comprises an associated sequence number; and determining, based on the estimated next sequence number, the second packet, the associated sequence number of the second packet, or some combination thereof, the current sequence number for the next packet in the communication session.

2. The method of claim 1,
wherein:
the associated sequence number of the second packet is representative of an acknowledgment of a last received sequence number for a last packet received by the remote computing device; and
determining the current sequence number comprises:
determining the associated sequence number of the second packet is equal to the estimated sequence number; and
determining the current sequence number is equal to a next ordered number after the associated sequence number, the estimated sequence number, or both.

3. The method of claim 2, wherein:
the communication session is a Stream Control Transmission Protocol (SCTP) connection; and
the current sequence number comprises a current transmission sequence number (TSN).

4. The method of claim 1, wherein determining the current sequence number comprises:
determining, based on the second packet, a gap of missing packets not received by the remote computing device, wherein the gap of missing packets comprises at least a first sequence number for a first missing packet;
transmitting a third packet to the remote computing device, wherein the third packet is a dummy packet comprising the first sequence number;
receiving a fourth packet from the remote computing device, wherein the fourth packet comprises an acknowledgment sequence number indicative of the remote computing device receiving the third packet;
determining the acknowledgment sequence number is equal to the estimated sequence number; and
determining the current sequence number is equal to a next ordered number after the acknowledgment sequence number, the estimated sequence number, or both.

5. The method of claim 1, wherein determining the current sequence number comprises:
determining, based on the second packet, at least a first duplicate sequence number;
transmitting a third packet to the remote computing device, wherein the third packet comprises an updated estimated sequence number determined based on the estimated sequence number and the associated sequence number;
receiving a fourth packet from the remote computing device, wherein the fourth packet comprises an acknowledgment sequence number; and
determining, based on the updated estimated sequence number, the fourth packet, the second acknowledgment sequence number, or some combination thereof, the current sequence number for the next packet in the communication session.

6. The method of claim 1,
wherein:
the second packet comprises a data packet; and
determining the current sequence number comprises:
determining the second packet is in response to the first packet; and
determining the current sequence number for the remote computing device is equal to the associated sequence number.

7. The method of claim 6, wherein:
the communication session is a Stream Control Transmission Protocol (SCTP) connection; and
the current sequence number comprises a current transmission sequence number (TSN).

8. The method of claim 1, further comprising transmitting a first stream packet to the remote computing device, wherein the first stream packet is a dummy packet comprising the estimated next sequence number wherein:
the first stream packet is:
for a first stream; and
configured so that the first stream packet is processed by the remote computing device in order based on the expected sequence number by the remote computing device;
the estimated sequence number of the first stream packet is an estimated sequence number for the first stream; and
determining the current sequence number comprises:
determining the second packet is a data packet sent in response to the first stream packet; and
determining the current sequence number for the first stream is equal to a next ordered number after the estimated sequence number.

9. The method of claim 8, wherein:
the communication session is a Stream Control Transmission Protocol (SCTP) connection; and
the current sequence number comprises a current stream sequence number (SSN) for the first stream.

10. The method of claim 8, further comprising:
sending a third packet for a second stream that is different than the first stream, wherein the third packet is configured so that the third packet is processed by the remote computing device in order and comprises an estimated sequence number for the second stream;
receiving a fourth packet from the remote computing device;
determining the fourth packet is a data packet sent in response to the third packet; and
determining a current sequence number for the second stream is equal to a next ordered number after the estimated sequence number for the second stream.

11. An apparatus configured to determine a current sequence number for a next packet in a communication session with a remote computing device, the apparatus comprising a processor in communication with memory, the processor being configured to execute instructions stored in the memory that cause the processor to:
determine an interruption in the communication session;
determine checkpointed data for the communication session, wherein the checkpointed data is indicative of a previous sequence number used for a previous packet sent to the remote computing device; and perform a resolution procedure to determine the current sequence number for the next packet in the communication session, comprising:
  determining an estimated next sequence number for transmitting data in the communication session based on the checkpointed data;
  transmitting a first packet to the remote computing device, wherein the first packet is a dummy packet comprising the estimated next sequence number, and wherein the first packet is configured so that the first packet is processed by the remote computing device regardless of an order of an estimated sequence number to an expected sequence number by the remote computing device;
  receiving a second packet from the remote computing device, wherein the second packet comprises an associated sequence number; and
  determining, based on the estimated next sequence number, the second packet, the associated sequence number of the second packet, or some combination thereof, the current sequence number for the next packet in the communication session.

12. The apparatus of claim 11, wherein:
  the associated sequence number of the second packet is representative of an acknowledgment of a last received sequence number for a last packet received by the remote computing device; and
  determining the current sequence number comprises:
  determining the associated sequence number of the second packet is equal to the estimated sequence number; and
  determining the current sequence number is equal to a next ordered number after the associated sequence number, the estimated sequence number, or both.

13. The apparatus of claim 12, wherein:
  the communication session is a Stream Control Transmission Protocol (SCTP) connection; and
  the current sequence number comprises a current transmission sequence number (TSN).

14. The apparatus of claim 11, wherein determining the current sequence number comprises:
  determining, based on the second packet, a gap of missing packets not received by the remote computing device, wherein the gap of missing packets comprises at least a first sequence number for a first missing packet;
  transmitting a third packet to the remote computing device, wherein the third packet is a dummy packet comprising the first sequence number;
  receiving a fourth packet from the remote computing device, wherein the fourth packet comprises an acknowledgment sequence number indicative of the remote computing device receiving the third packet;
  determining the acknowledgment sequence number is equal to the estimated sequence number; and
  determining the current sequence number is equal to a next ordered number after the acknowledgment sequence number, the estimated sequence number, or both.

15. The apparatus of claim 11, wherein determining the current sequence number comprises:
  determining, based on the second packet, at least a first duplicate sequence number;
  transmitting a third packet to the remote computing device, wherein the third packet comprises an updated estimated sequence number determined based on the estimated sequence number and the associated sequence number;
  receiving a fourth packet from the remote computing device, wherein the fourth packet comprises an acknowledgment sequence number; and
  determining, based on the updated estimated sequence number, the fourth packet, the second acknowledgement sequence number, or some combination thereof, the current sequence number for the next packet in the communication session.

16. The apparatus of claim 11, wherein:
  the second packet comprises a data packet; and
  determining the current sequence number comprises:
  determining the second packet is in response to the first packet; and
  determining the current sequence number for the remote computing device is equal to the associated sequence number.

17. The apparatus of claim 16, wherein:
  the communication session is a Stream Control Transmission Protocol (SCTP) connection; and
  the current sequence number comprises a current transmission sequence number (TSN).

18. The apparatus of claim 11, further comprising transmitting a first stream packet to the remote computing device, wherein the first stream packet is a dummy packet comprising the estimated next sequence number wherein:
  the first stream packet is:
    for a first stream; and
    configured so that a stream first packet is processed by the remote computing device in order based on the expected sequence number by the remote computing device;
  the estimated sequence number of the first stream packet is an estimated sequence number for the first stream; and
  determining the current sequence number comprises:
  determining the second packet is a data packet sent in response to the first stream packet; and
  determining the current sequence number for the first stream is equal to a next ordered number after the estimated sequence number.

19. The apparatus of claim 18, wherein:
  the communication session is a Stream Control Transmission Protocol (SCTP) connection; and
  the current sequence number comprises a current stream sequence number (SSN) for the first stream.

20. The apparatus of claim 18, wherein the processor is further configured to execute instructions stored in the memory that cause the processor to:
  send a third packet for a second stream that is different than the first stream, wherein the third packet is configured so that the third packet is processed by the remote computing device in order and comprises an estimated sequence number for the second stream;
  receive a fourth packet from the remote computing device;
  determine the fourth packet is a data packet sent in response to the third packet; and
  determine a current sequence number for the second stream is equal to a next ordered number after the estimated sequence number for the second stream.

* * * * *

UNITED STATES PATENT AND TRADEMARK OFFICE
CERTIFICATE OF CORRECTION

PATENT NO. : 11,218,578 B2
APPLICATION NO. : 16/782978
DATED : January 4, 2022
INVENTOR(S) : Shane Hooker et al.

It is certified that error appears in the above-identified patent and that said Letters Patent is hereby corrected as shown below:

In the Claims

Column 24, Claim 1, Lines 52-53, "current data transmission sequence" should read --current sequence--.

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*